(12) United States Patent
Park et al.

(10) Patent No.: US 12,549,718 B2
(45) Date of Patent: Feb. 10, 2026

(54) IMAGE PROCESSING METHOD AND DEVICE FOR AI-BASED FILTERING

(71) Applicant: Samsung Electronics Co., Ltd., Suwon-si (KR)

(72) Inventors: Minsoo Park, Suwon-si (KR); Kyungah Kim, Suwon-si (KR); Quockhanh Dinh, Suwon-si (KR); Minwoo Park, Suwon-si (KR); Kwangpyo Choi, Suwon-si (KR); Yinji Piao, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 72 days.

(21) Appl. No.: 18/421,082

(22) Filed: Jan. 24, 2024

(65) Prior Publication Data

US 2024/0187581 A1    Jun. 6, 2024

Related U.S. Application Data

(63) Continuation of application No. PCT/KR2022/015385, filed on Oct. 12, 2022.

(30) Foreign Application Priority Data

Nov. 5, 2021  (KR) .......................... 10-2021-0151778
Sep. 21, 2022 (KR) .......................... 10-2022-0119538

(51) Int. Cl.
*H04N 19/117*    (2014.01)
*H04N 19/124*    (2014.01)
(Continued)

(52) U.S. Cl.
CPC ......... *H04N 19/117* (2014.11); *H04N 19/124* (2014.11); *H04N 19/137* (2014.11);
(Continued)

(58) Field of Classification Search
CPC ........................... H04N 19/117; H04N 19/124
See application file for complete search history.

(56) References Cited

U.S. PATENT DOCUMENTS 11,095,887 B2    8/2021    Kim
11,197,013 B2    12/2021   Lee
(Continued)

FOREIGN PATENT DOCUMENTS

CN    113810715 A   * 12/2021   ............. G06N 3/045
KR    100681920 B1    2/2007
(Continued)

OTHER PUBLICATIONS

International Search Report for PCT/KR2022/015385 mailed Jan. 25, 2023, 5 pages.
(Continued)

*Primary Examiner* — Irfan Habib
(74) *Attorney, Agent, or Firm* — Nixon & Vanderhye P.C.

(57) ABSTRACT

An image processing method for artificial intelligence (AI)-based filtering includes: obtaining motion information regarding inter prediction of a current block of a current reconstructed image, based on the motion information regarding the inter prediction, determining at least one reference reconstructed image regarding the current reconstructed image, based on the motion information and the at least one reference reconstructed image, determining at least one reference block, by inputting the current block and the at least one reference block to a neural network, obtaining an output block corresponding to the current block, and based on the output block, obtaining a modified current reconstructed image, wherein the neural network is trained using training data including the current block, the at least one
(Continued)

reference block, and the output block, to reduce an error between the current block and an original block corresponding to the current block.

14 Claims, 22 Drawing Sheets

(51) Int. Cl.
*H04N 19/137* (2014.01)
*H04N 19/159* (2014.01)
*H04N 19/176* (2014.01)
*H04N 19/82* (2014.01)

(52) U.S. Cl.
CPC ......... *H04N 19/159* (2014.11); *H04N 19/176* (2014.11); *H04N 19/82* (2014.11)

(56) References Cited

U.S. PATENT DOCUMENTS

| | | | |
|---|---|---|---|
| 11,265,551 B2 | 3/2022 | Chen | |
| 12,316,859 B2* | 5/2025 | Zhang | H04N 19/192 |
| 2015/0103911 A1 | 4/2015 | Lee | |
| 2019/0222848 A1* | 7/2019 | Chen | H04N 19/105 |
| 2021/0329286 A1 | 10/2021 | Wang | |
| 2021/0344922 A1* | 11/2021 | Zhang | H04N 19/124 |
| 2021/0344964 A1* | 11/2021 | Drugeon | H04N 19/188 |
| 2022/0094962 A1* | 3/2022 | Choi | H04N 19/503 |
| 2022/0191483 A1* | 6/2022 | Li | H04N 19/82 |
| 2022/0337853 A1* | 10/2022 | Li | H04N 19/31 |
| 2022/0394308 A1* | 12/2022 | Li | H04N 19/82 |
| 2022/0405979 A1* | 12/2022 | Ding | G06N 3/047 |
| 2023/0007246 A1* | 1/2023 | Li | H04N 19/117 |
| 2023/0044603 A1* | 2/2023 | Piao | H04N 19/132 |
| 2023/0112309 A1* | 4/2023 | Hannuksela | H04N 19/184 375/240.29 |
| 2024/0037802 A1* | 2/2024 | Solovyev | H04N 19/117 |
| 2024/0056570 A1* | 2/2024 | Li | H04N 19/186 |
| 2024/0064318 A1* | 2/2024 | Letunovskiy | H04N 19/42 |
| 2024/0095097 A1* | 3/2024 | Pottorff | G06T 1/20 |
| 2024/0095881 A1* | 3/2024 | Pottorff | G06T 3/4007 |
| 2024/0098216 A1* | 3/2024 | Pottorff | H04N 19/132 |
| 2024/0104689 A1* | 3/2024 | Pottorff | G06T 3/4046 |
| 2024/0104690 A1* | 3/2024 | Pottorff | G06T 3/4007 |
| 2024/0104692 A1* | 3/2024 | Pottorff | G06T 3/4046 |
| 2024/0121387 A1* | 4/2024 | Lainema | H04N 19/42 |
| 2024/0202507 A1* | 6/2024 | Cricrì | G06N 3/0464 |
| 2024/0267543 A1* | 8/2024 | Zou | H04N 19/88 |
| 2025/0106355 A1* | 3/2025 | Luo | G06T 7/579 |
| 2025/0119541 A1* | 4/2025 | Li | G06N 3/0464 |

FOREIGN PATENT DOCUMENTS

| | | |
|---|---|---|
| KR | 20130116216 A | 10/2013 |
| KR | 101772472 B1 | 8/2017 |
| KR | 20180001428 A | 1/2018 |
| KR | 102072576 B1 | 2/2020 |
| KR | 20200016943 A | 2/2020 |
| KR | 20200108432 A | 9/2020 |
| KR | 20210066715 A | 6/2021 |
| WO | 2023014065 A1 | 2/2023 |

OTHER PUBLICATIONS

Written Opinion of the ISA for PCT/KR2022/015385, mailed Jan. 25, 2023, 5 pages.

* cited by examiner

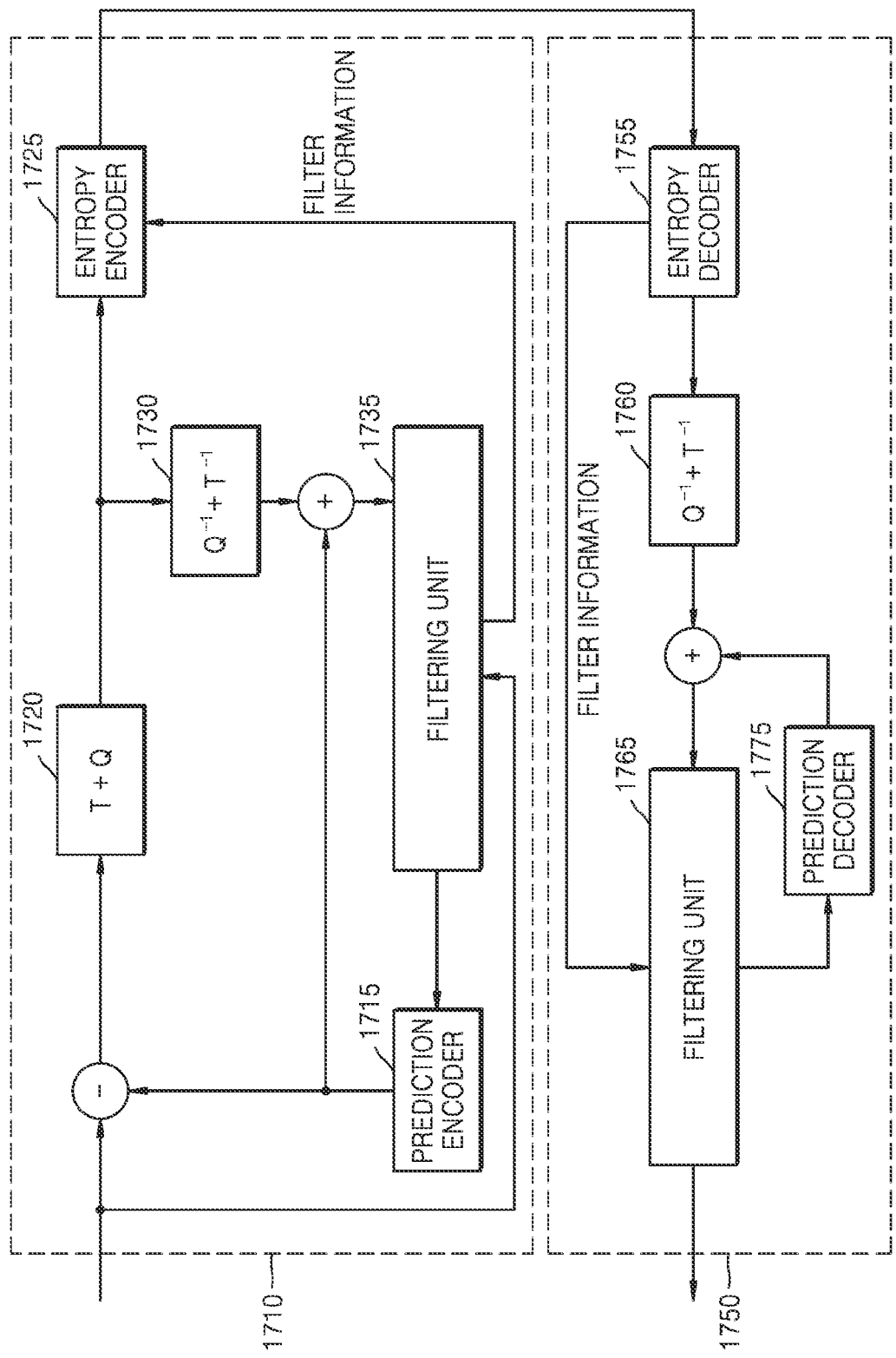

IMAGE PROCESSING METHOD AND DEVICE FOR AI-BASED FILTERING

CROSS-REFERENCE TO RELATED APPLICATIONS

This application is a continuation of International Application No. PCT/KR2022/015385 designating the United States, filed on Oct. 12, 2022, in the Korean Intellectual Property Receiving Office and claiming priority to Korean Patent Application Nos. 10-2021-0151778, filed on Nov. 5, 2021, and 10-2022-0119358, filed on Sep. 21, 2022, in the Korean Intellectual Property Office, the disclosures of each of which are incorporated by reference herein in their entireties.

BACKGROUND

Field

The disclosure relates to an image processing method and an image processing apparatus, and for example, to a method and apparatus for processing an image using artificial intelligence (AI)-based filtering. For example, using the AI-based filtering, may reduce an error between a reconstructed image and an original image.

Description of Related Art

According to a codec, such as H. 264 advanced video coding (AVC), high efficiency video coding (HEVC), and versatile video coding (VVC), an image may be split into blocks, and each block may be prediction-encoded and prediction-decoded through inter prediction or intra prediction. A prediction block generated through intra prediction or inter prediction may be added to a residual block to reconstruct a current block. The reconstructed current block may be output after being processed according to one or more filtering algorithms.

In the codec, such as the H.264 AVC, the HEVC, and the VVC, a rule-based filtering algorithm is used for filtering the reconstructed current block. The rule-based filtering algorithm may include, for example, a deblocking filter, a sample adaptive offset (SAO) filter, and an adaptive loop filter (ALF).

Traditionally, rule-based filtering algorithms have exhibited high performance. However, as the resolution of images has increased, and content of the images has become more diversified, an artificial intelligence (AI)-based filtering algorithm for flexibly taking into account the characteristics of the image may be required.

SUMMARY

According to an example embodiment of the disclosure, there may be provided an image processing method for artificial intelligence (AI)-based filtering. The image processing method may include: obtaining motion information regarding inter prediction of a current block of a current reconstructed image; determining, based on the motion information, at least one reference reconstructed image regarding the current reconstructed image; determining, based on the motion information and the at least one reference reconstructed image, at least one reference block; obtaining, by inputting the current block and the at least one reference block to a neural network, an output block corresponding to the current block; obtaining, based on the output block, a modified current reconstructed image. The neural network may be trained using training data including the current block, the at least one reference block, and the output block, to reduce an error between the current block and an original block corresponding to the current block.

According to an example embodiment of the disclosure, there may be provided an image processing apparatus for artificial intelligence (AI)-based filtering. The image processing apparatus may include: a memory storing at least one instruction and at least one processor, comprising processing circuitry, individually and/or collectively configured to: obtain motion information regarding inter prediction of a current block of a current reconstructed image; determine, based on the motion information, at least one reference reconstructed image regarding the current reconstructed image; determine, based on the motion information and the at least one reference reconstructed image, at least one reference block; obtain an output block corresponding to the current block, by inputting the current block and the at least one reference block to a neural network; obtain a modified current reconstructed image, based on the output block. The neural network may be trained using training data including the current block, the at least one reference block, and the output block, to reduce an error between the current block and an original block corresponding to the current block.

According to an example embodiment of the disclosure, there may be provided a non-transitory computer-readable recording medium having stored thereon a program for executing the image processing method for AI-based filtering.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 17 is a diagram illustrating an example configuration of an encoding apparatus and a decoding apparatus, according to various embodiments;

DETAILED DESCRIPTION

Figure 1:
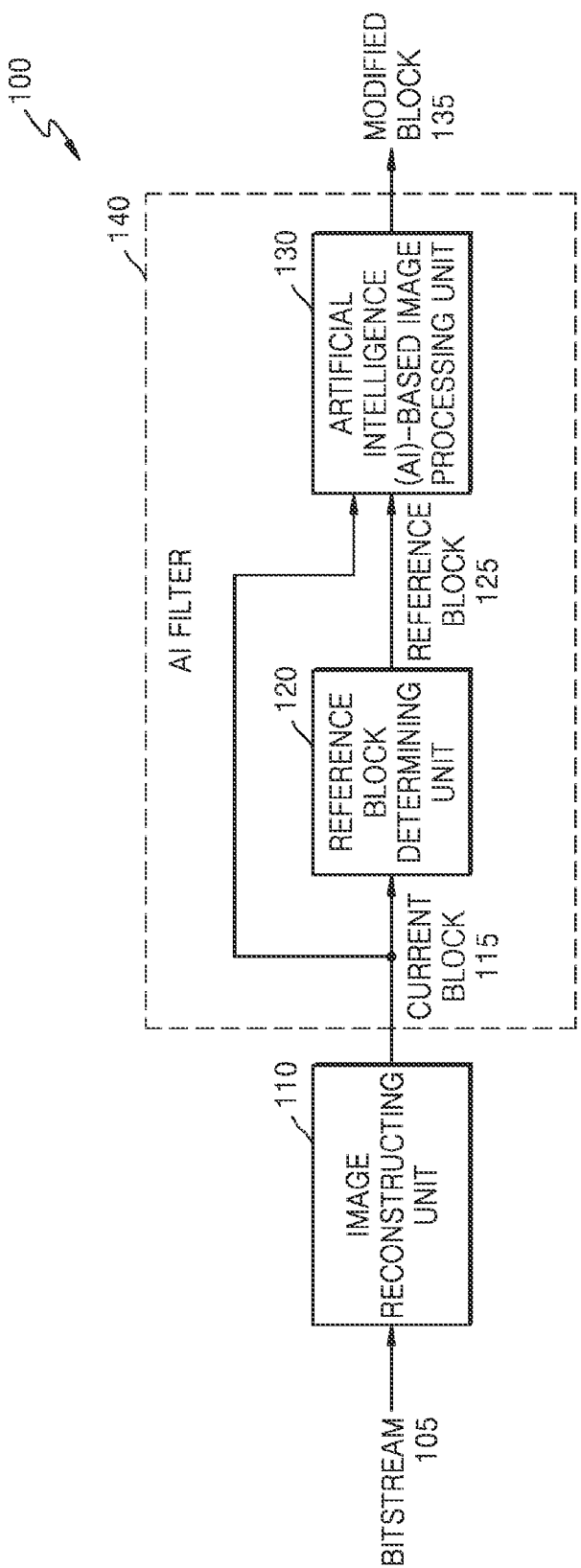
FIG. 1 is a diagram illustrating an artificial intelligence (AI)-based filtering process on an image, according to various embodiments.

As the disclosure allows for various changes and numerous examples, example embodiments of the disclosure will be illustrated in the drawings and described in greater detail below. However, this is not intended to limit the disclosure to particular modes of practice, and it will be understood that all changes, equivalents, and substitutes that do not depart from the spirit and technical scope of various embodiments of the disclosure are encompassed in the disclosure.

When describing various embodiments, well-known arts may not be described in detail, when it is determined that the detail descriptions thereof may unnecessarily obscure the concept of the disclosure. Also, numbers (for example, a first, a second, and the like) used in the disclosure are merely identifiers for distinguishing one element from another.

When it is described in this disclosure that one element is "connected to" or "in connection with" another element, the element may be directly connected to or in connection with the other element, but it shall be also understood that the element may be connected to or in connection with the other element with yet another element present therebetween, unless particularly otherwise described.

Regarding an element referred to as a "portion (unit)," a "module," etc., two or more elements may be combined into one element, or one element may be divided into two or more elements each having a specified function. Each of the elements to be described hereinafter may additionally perform part or all of functions performed by other elements, in addition to a main function of each of the elements, and the other elements may take full charge of part of the main function of each of the elements.

In the disclosure, an "image" may refer, for example, to a still image (or a frame or a picture), a moving image including a plurality of consecutive still images, or a video.

In the disclosure, a "block" may refer, for example, to a portion of an image. For example, an image may be split into a plurality of blocks according to a predetermined criterion. According to an embodiment of the disclosure, an image may be split into blocks having predetermined sizes. For example, an image may be split into 32×32, 64×64, or coding tree unit (CTU) sizes. According to an embodiment of the disclosure, an image may be split into a plurality of blocks having different sizes, depending on a condition. For example, depending on a split condition, an image may be split as a type of at least one of a binary split, a ternary split, or a quad split.

In the disclosure, a "neural network" may refer to a representative example of an artificial neural network model replicating brain neurons and is not limited to an artificial neural network model using a predetermined algorithm. For example, the neural network may refer to at least one of a deep neural network (DNN), a convolutional neural network (CNN), a recurrent neural network (RNN), a long short-term memory (LSTM), or a generative adversarial network (GAN) but is not limited thereto.

In the disclosure, a "parameter" may be a value used in a calculation process of each of layers forming a neural network and may be used, for example, to apply an input value to a predetermined calculation formula. A parameter may be a value that is set as a result of training and may be updated through additional training data, according to necessity.

In the disclosure, "feature data" may refer, for example, to data obtained by processing, via a neural network-based encoder, input data. The feature data may be one-dimensional or two-dimensional data including various samples. The feature data may also be referred to as latent representation. The feature data may refer to latent features of data output by a decoder described below.

In the disclosure, a "reconstructed image" may refer, for example, to an image obtained by decoding an original image using data obtained by encoding the original image. According to an embodiment of the disclosure, the reconstructed image may refer, for example, to a decoded image, on which artificial intelligence (AI)-based filtering is not performed.

In the disclosure, an "image processing apparatus" may include an image decoding apparatus or an image encoding apparatus. In the disclosure, an "image processing method" may include an image decoding method and/or an image encoding method.

FIG. 1 is a diagram illustrating an example AI-based filtering process on an image, according to various embodiments.

Referring to FIG. 1, an image decoding apparatus 100 may include an image reconstructing unit 110 and an AI filter 140, each of which may include various processing circuitry and/or executable program instructions. The image reconstructing unit 110 may generate a reconstructed image by decoding a bitstream 105. According to an embodiment of the disclosure, the reconstructed image may be obtained by performing a decoding operation using data obtained by encoding an original image and may be an image before being input to the AI filter 140.

The AI filter 140 may include a reference block determining unit 120 and an AI-based image processing unit 130, each of which may include various processing circuitry and/or executable program instructions. The AI filter 140 may receive a current block 115 of a current reconstructed image and output a modified block 135 corresponding to the current block 115.

The reference block determining unit 120 may determine, based on the current block 115 of the current reconstructed image, at least one reference block 125 to be referred to by the AI-based image processing unit 130. According to an embodiment of the disclosure, the reference block 125 may refer, for example, to at least a portion included in the reconstructed image except the current reconstructed image. According to an embodiment of the disclosure, a method, performed by the image decoding apparatus 100, of determining the reference block 125 will be described in greater detail below with reference to FIG. 2.

The AI-based image processing unit 130 may output the modified block 135 using the current block 115 and the at least one reference block 125 as an input. According to an embodiment of the disclosure, the AI-based image processing unit 130 may include a neural network trained in order to reduce an error between the reconstructed image generated by the image reconstructing unit 100 and the original image corresponding to the reconstructed image. According to an embodiment of the disclosure, the image decoding apparatus 100 may obtain a modified current reconstructed image, based on the modified block 135.

The neural network (NN) may be trained using training data including input data and output data such that the input data may have the form of the output data. Here, a structure of the neural network to be trained well may be important, but which data to be trained and to be actually used may also be important. Also, for the neural network to perform various functions, the neural network may have to have a corresponding large parameter.

According to an embodiment of the disclosure, when a method of improving, using a neural network, image quality of each of images obtained after reconstructing a compressed image, in units of blocks, is used, the performance of the neural network may be improved and the size of the neural network may be reduced, using, as inputs of the neural network, not only an image block, image quality of which is to be improved, but also a reference image block having a similar shape as the image block, based on motion information.

Figure 2:
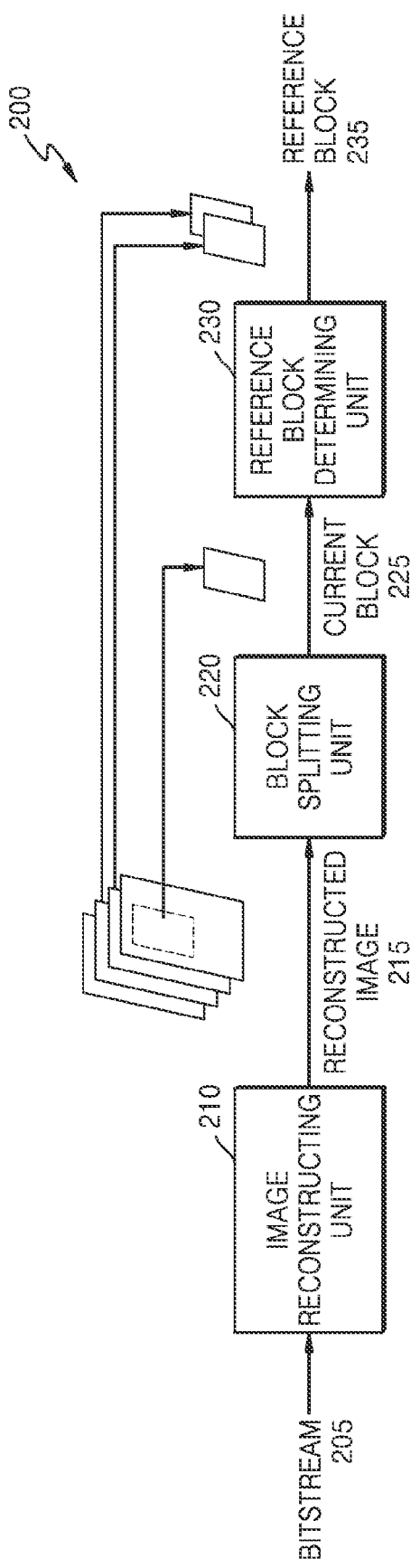
FIG. 2 is a diagram illustrating an example process of determining a reference block, according to various embodiments.

FIG. 2 is a diagram illustrating an example process of determining a reference block, according to various embodiments.

Referring to FIG. 2, an image decoding apparatus 200 may include an image reconstructing unit 210, a block splitting unit 220, and a reference block determining unit 230 each of which may include various processing circuitry and/or executable program instructions. According to an embodiment of the disclosure, the image decoding apparatus 200 of FIG. 2 may be the image decoding apparatus 100 of FIG. 1.

The image decoding apparatus 200 may determine a reference block 235 corresponding to a current block 225, based on a reconstructed image 215 generated by decoding a bitstream 205. The bitstream 205, the image reconstructing unit 210, the current block 225, a reference block determining unit 230, and the reference block 235 of FIG. 2 may correspond to the bitstream 105, the image reconstructing unit 110, the current block 115, the reference block determining unit 120, and the reference block 125 of FIG. 1.

The image reconstructing unit 210 may generate the reconstructed image 215 by decoding the bitstream 205.

The block splitting unit 220 may split a current reconstructed image of the reconstructed image 215 into a plurality of blocks. For example, the current reconstructed image may be split into 64×64 blocks. According to an embodiment of the disclosure, the block splitting unit 220 may split the current reconstructed image into a plurality of blocks, so that the plurality of blocks may be the same as prediction blocks which are split when the current reconstructed image is prediction-decoded. The block splitting unit 220 may output the current block 225 of the current reconstructed image.

The reference block determining unit 230 may determine at least one reference block 235, based on the current block 225 of the current reconstructed image. According to an embodiment of the disclosure, the reference block determining unit 230 may determine the reference block 235, based on motion information of the current block 225. According to an embodiment of the disclosure, the reference block determining unit 230 may determine a reference reconstructed image from the reconstructed image 215, based on the motion information of the current block 225. According to an embodiment of the disclosure, the reference block determining unit 230 may determine the reference block from the reference reconstructed image. The method, performed by the image decoding apparatus 200, of determining the reference block 235, based on the motion information of the current block 225 will be described in greater detail below with reference to FIGS. 7, 8, 9 and 12.

According to an embodiment of the disclosure, the reference block determining unit 230 may determine a reference block, based on a pixel value of a current block. For example, the reference block determining unit 230 may determine a candidate block having a pixel value having a less difference from a pixel value of the current block 225 from among a plurality of candidate blocks, as the reference block 235. According to an embodiment of the disclosure, the method, performed by the image decoding apparatus 120, of determining the reference block, based on the pixel value of the current block will be described in greater detail below with reference to FIG. 13.

According to an embodiment of the disclosure, the image decoding apparatus 200 may obtain a modified block by inputting the current block 225 and the reference block 235 to the AI-based image processing unit 130 of FIG. 1.

Figure 3:
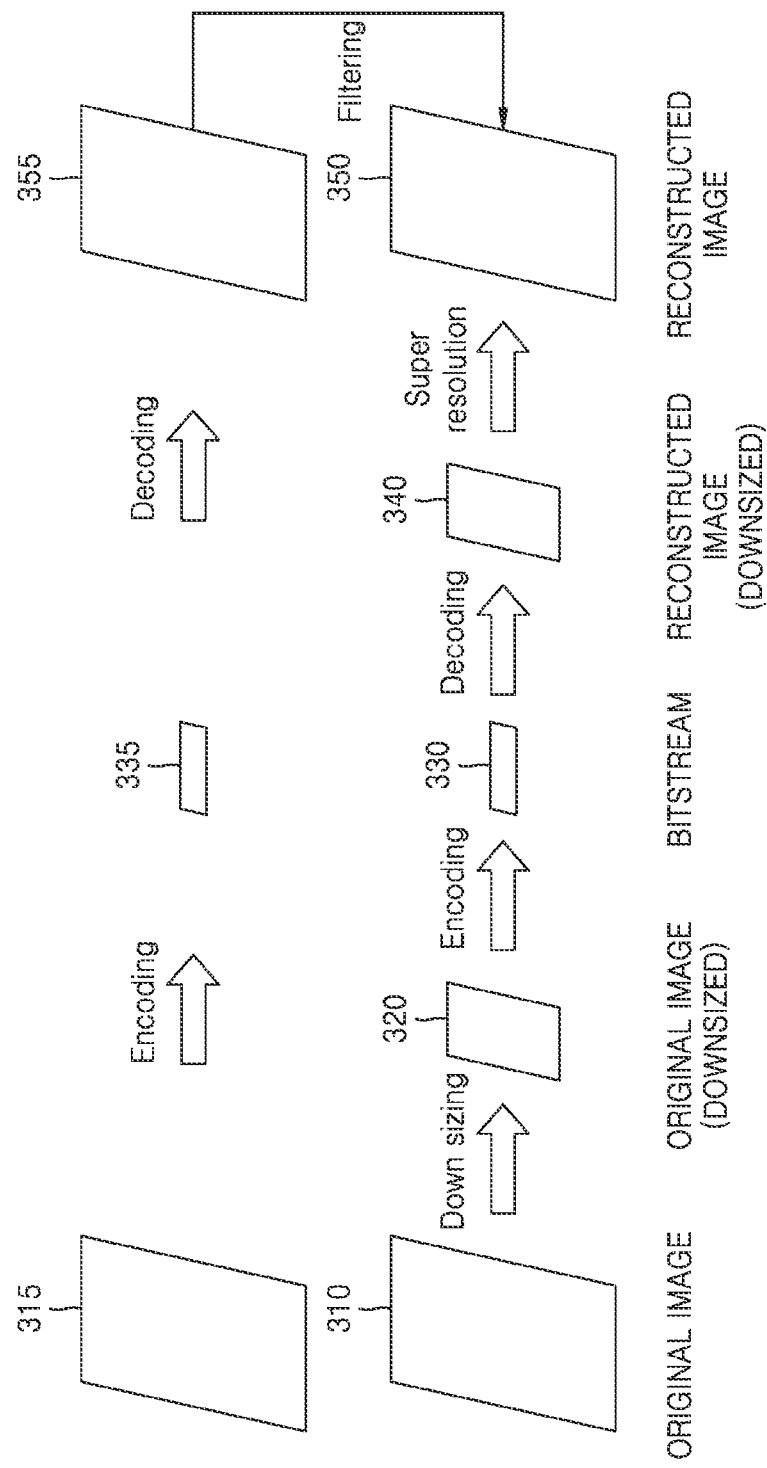
FIG. 3 is a diagram illustrating an example method of encoding and decoding an image, according to various embodiments.

FIG. 3 is a diagram illustrating an example method of encoding and decoding an image, according to various embodiments.

According to an embodiment of the disclosure, an original image 315 may be encoded by an encoding apparatus and may be transmitted in the form of a bitstream 335 to a decoding apparatus. The decoding apparatus may decode the bitstream 335 to generate a reconstructed image 335.

According to an embodiment of the disclosure, an original image 310 may be down-sized by the encoding apparatus. A down-sized original image 320 may be encoded by the encoding apparatus and may be transmitted in the form of a bitstream 330 to the decoding apparatus. The decoding apparatus may decode the bitstream 335 to generate a down-sized reconstructed image 340. The decoding apparatus may generate a reconstructed image 350 by upscaling the down-sized reconstructed image 340. In the disclosure, the upscaling may refer, for example, to a process of enlarging an image. For example, the decoding apparatus may upscale the down-sized reconstructed image 340 to obtain the reconstructed image 350. According to an embodiment of the disclosure, the upscaling process may be referred to as super-resolution. According to an embodiment of the disclosure, the upscaling or the super-resolution may be performed by a neural network.

A method of encoding an original image by down-sizing the original image may be advantageous for data compression. However, the method of encoding the original image by down-sizing the original image may have a relatively greater error between the original image and a reconstructed image, compared to a method of encoding the original image without down-sizing the original image.

According to an embodiment of the disclosure, the decoding apparatus may filter, based on a reconstructed image 355 which is not upscaled, the reconstructed image 350 obtained by upscaling the down-sized reconstructed image 340. For example, the decoding apparatus may perform a filtering process for reducing an error between the reconstructed image 350 and the original image 310 using the reconstructed image 355. According to an embodiment of the disclosure, the resolution may be the same between the reconstructed image 355 which is not upscaled and the reconstructed image 350 which is upscaled.

According to an embodiment of the disclosure, the decoding apparatus may perform the filtering process using an AI model. According to an embodiment of the disclosure, the AI model for the filtering may be trained using the upscaled reconstructed image 350 and the non-upscaled reconstructed image 355 as inputs and the original image 310 as an output, in order to reduce an error between the original image 310 and the reconstructed image 350.

For convenience of explanation, FIG. 3 is described based on the case where there is one reconstructed image 355. However, the disclosure is not limited thereto, and the same operations may be performed also when there are a plurality of reconstructed images 355.

Figure 4:
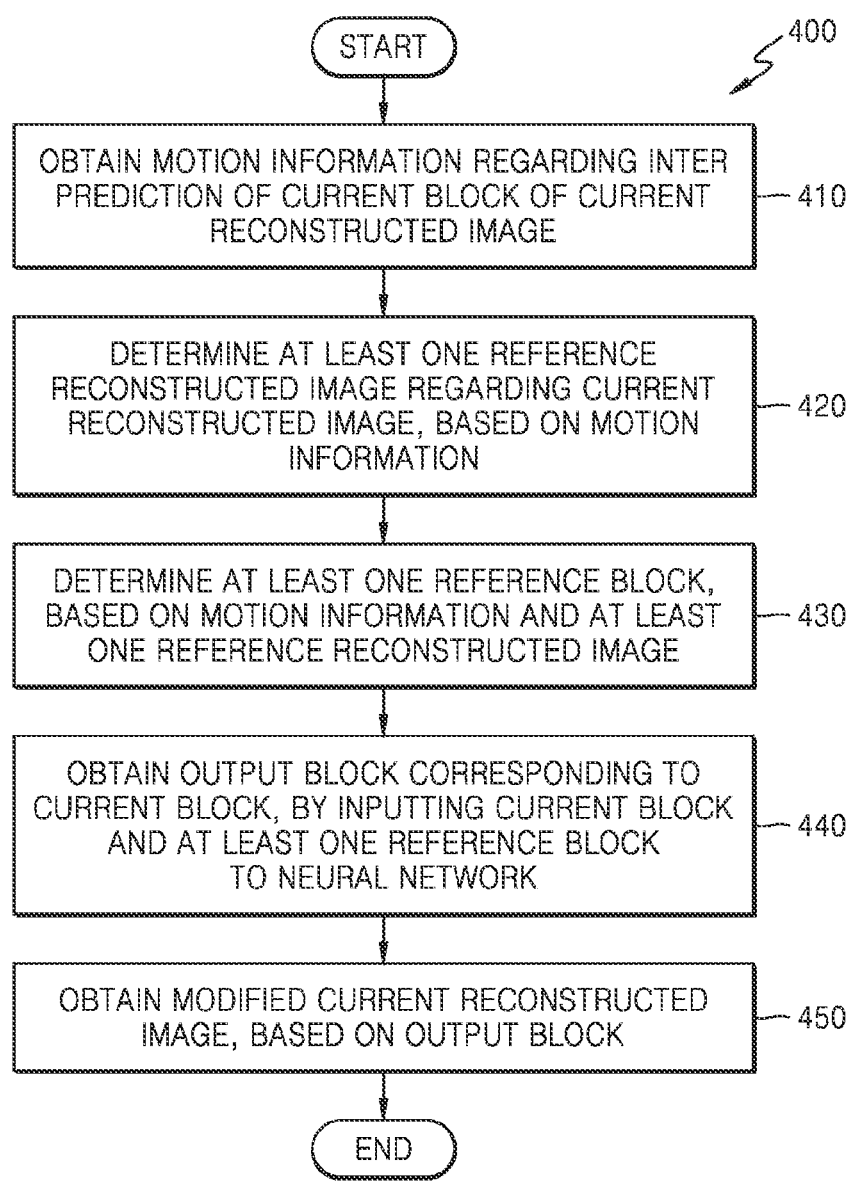
FIG. 4 is a flowchart illustrating an example image processing method for AI-based filtering, according to various embodiments.

FIG. 4 is a flowchart illustrating an example image processing method for AI-based filtering, according to various embodiments.

Referring to FIG. 4, an image processing method 400 may start with operation 410. According to an embodiment of the disclosure, the image processing method 400 may be performed by the image decoding apparatus 100.

In operation 410, the image processing method 400 may include obtaining motion information regarding inter prediction of a current block of a current reconstructed image. According to an embodiment of the disclosure, when the current block is regarding intra prediction, it may be determined that there is no motion information. According to an embodiment of the disclosure, the motion information may include at least one of information of a reference reconstructed image or information regarding a motion vector. According to an embodiment of the disclosure, the motion information of the current block of the current reconstructed image may be determined by the decoding apparatus. According to an embodiment of the disclosure, the motion information of the current block of the current reconstructed image may be obtained by receiving information determined by the encoding apparatus.

In operation 420, the image processing method 400 may include determining, based on the motion information, at least one reference reconstructed image regarding the current reconstructed image. For example, when the motion information includes information regarding a reference image, the reference reconstructed image may be determined to correspond to the motion information.

In operation 430, the image processing method 400 may include determining at least one reference block, based on the motion information and the at least one reference reconstructed image. According to an embodiment of the disclosure, the motion information may include information regarding a position of the reference block in the reference reconstructed image.

In operation 440, the image processing method 400 may include obtaining an output block corresponding to the current block by inputting the current block and the at least one reference block to a neural network. According to an embodiment of the disclosure, the neural network may be trained in order to reduce an error between the current block and a block of an original image corresponding to the current block.

In operation 450, the image processing method 400 may include obtaining a modified current reconstructed image, based on the output block.

Figure 5:
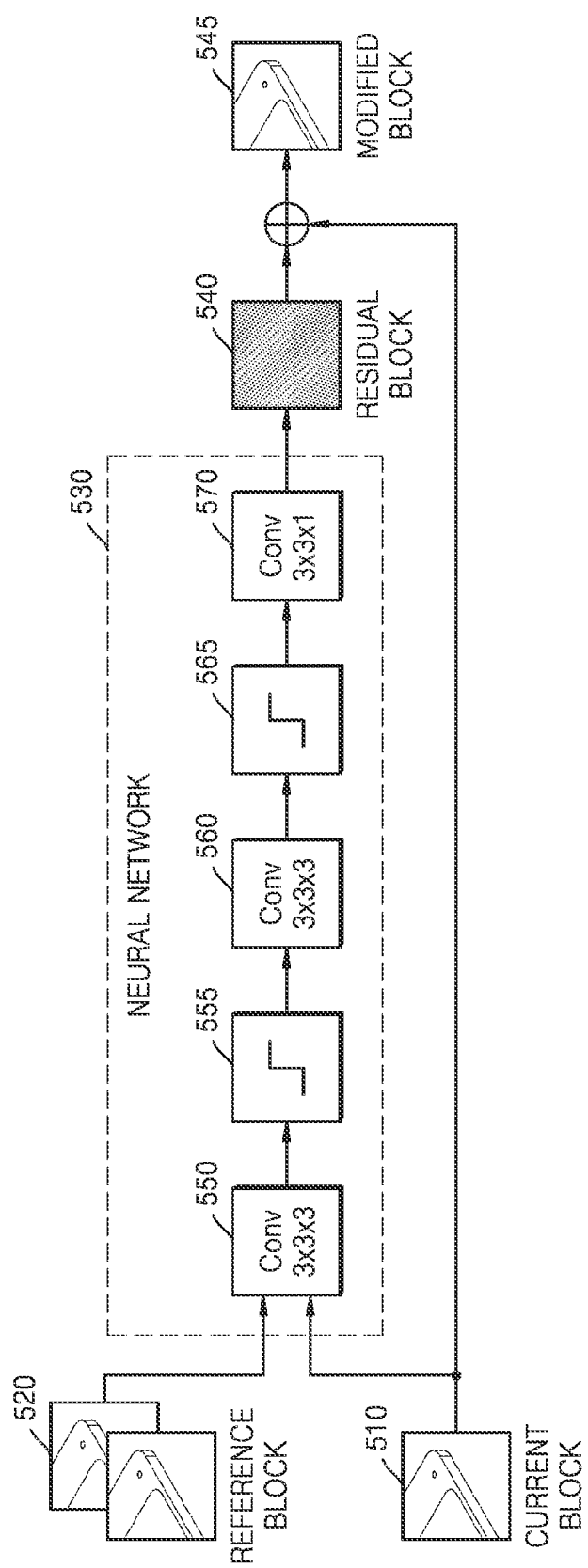
FIG. 5 is a diagram illustrating an example method of obtaining a modified block using a neural network, according to various embodiments.

FIG. 5 is a diagram illustrating an example method of obtaining a modified block using a neural network, according to various embodiments.

Referring to FIG. 5, a neural network 530 may use a current block 510 and a reference block 520 as inputs and use a residual block 540 as an output. A modified block 545 may be obtained by adding the residual block 540 with the current block 510. According to an embodiment of the disclosure, operation 450 of FIG. 4 may be performed based on the method of FIG. 5. According to an embodiment of the disclosure, the AI-based image processing unit 130 of FIG. 1 may include the neural network 530.

The neural network 530 may include a plurality of convolutional layers 550, 560, and 570 and a plurality of activation layers 555 and 565.

A first convolutional layer 550 may use the current block 510 and the reference block 520 as inputs and may output feature maps. The feature maps of the first convolution layer 550 may be input to a first activation layer 555.

The first activation layer 555 may assign a non-linear characteristic to each of the feature maps. The first activation layer 555 may include a sigmoid function, a Tanh function, a rectified linear unit (ReLU) function, etc. but is not limited thereto.

To assign the non-linear characteristics by the first activation layer 555 may, for example, output the feature maps by changing some of sample values of the feature maps. Here, the changing may be performed by applying the non-linear characteristics.

The first activation layer 555 may determine whether to transmit the sample values of the feature maps to a second convolutional layer 560. For example, some of the sample values of the feature maps may be activated by the first activation layer 555 and transmitted to the second convolutional layer 560, and some sample values may be non-activated by the first activation layer 555 and may not be transmitted to the second convolutional layer 560. Intrinsic characteristics of input data indicated by the feature maps may be emphasized by the first activation layer 555.

The feature maps output by the first activation layer 555 may be input to the second convolutional layer 560.

3×3×3 indicated in the second convolutional layer 560 indicates that a convolution process is performed on the input feature maps using 3 filter kernels having a size of 3×3. An output of the second convolutional layer 560 may be input to the second activation layer 565. The second activation layer 565 may assign a non-linear characteristic to the input feature maps.

Feature maps output by the second activation layer 565 may be input to a third convolutional layer 570. 3×3×1 indicated in the third convolutional layer 570 indicates that a convolution process is performed for generating one piece of output data using one filter kernel having a size of 3×3.

The modified block 545 may be obtained by adding the residual block 540 corresponding to an output of the third convolutional layer 570 with the current block 510.

For convenience of explanation, it is described based on the case where the neural network includes three convolutional layers and two activation layers. However, the number of the convolutional layers and the number of the activation layers are not limited thereto and may vary. Likewise, the sizes of the convolutional layers are not limited and may be appropriately modified by one of ordinary skill in the art. Likewise, it is described based on the case where the neural network is a CNN. However, the neural network is not limited thereto, and various neural network models, such as an RNN, DNN, or the like, may be used.

Figure 6:
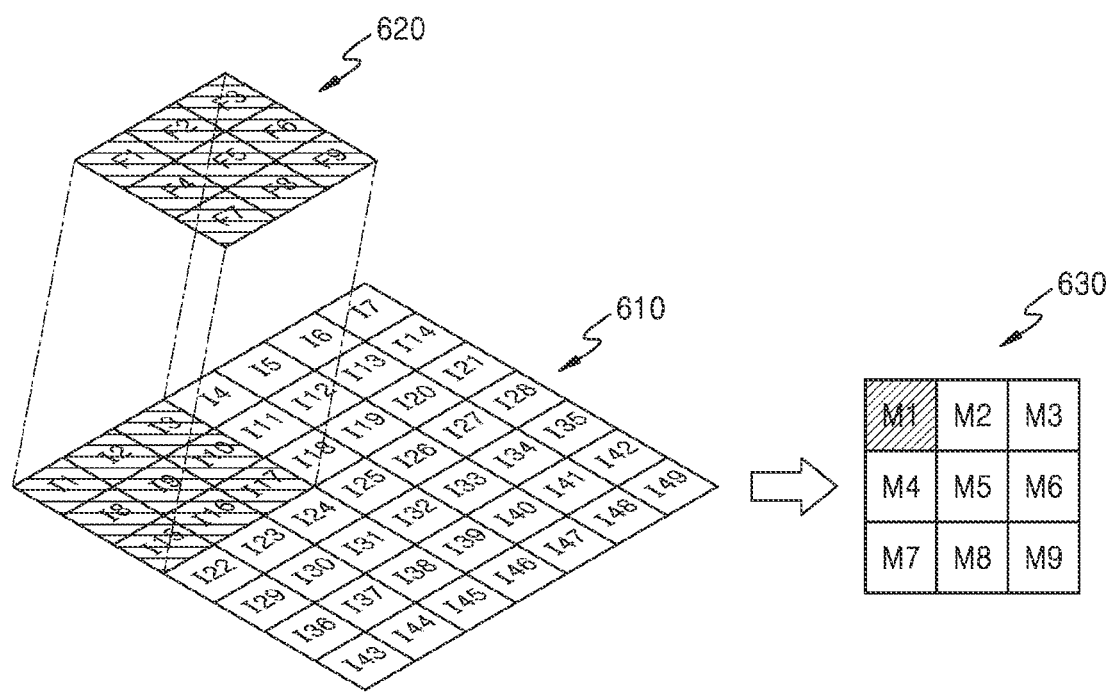
FIG. 6 is a diagram illustrating a convolution operation according to various embodiments.

FIG. 6 is a diagram illustrating an example convolution operation according to various embodiments.

Referring to FIG. 6, convolution operations by the first convolutional layer 550, the second convolutional layer 560, and the third convolutional layer 570 of FIG. 5 are described. According to an embodiment of the disclosure, input data 610 may be at least one of the reference block 510 or the current block 520 of FIG. 5. For convenience of explanation, the operation by the first convolutional layer 550 is described. However, the convolution operation is not limited thereto and may be likewise applied to other convolutional layers.

According to an embodiment of the disclosure, one feature map 630 may be generated by multiplication and summation between parameters of a filter kernel 620 having the size of 3×3 used by the first convolutional layer 550 and sample values in the input data 610 corresponding to the parameters. According to an embodiment of the disclosure, one or more filter kernels 620 may be used by the first convolutional layer 550. For example, N feature maps 530 may be generated by a convolution operation using N filter kernels 620. According to an embodiment of the disclosure, when there are N channels of the input data 610 of the first convolutional layer 550, N feature maps 630 may be generated through the convolution operation using each of the N filter kernels 620.

I1 to I49 indicated in the input data 610 may indicate samples of the input data 610, and F1 to F9 indicated in the filter kernel 620 may indicate samples (may also be referred to as parameters) of the filter kernel 620. Also, M1 to M9 indicated in the feature map 630 may indicate samples of the feature map 530.

In the convolution operation, multiplication operations between each of sample values of I1, I2, I3, I8, I9, I10, I15, I16, and I17 of the input data 610 and each of F1, F2, F3, F4, F5, F6, F7, F8, and F9 of the filter kernel 620 may be performed, and a value obtained by combining (for example, summing) result values of the multiplication operations may be determined as a value of M1 of the feature map 630. When a stride of the convolution operation is 2, multiplication operations between each of sample values of I3, I4, I5, I10, I11, I12, I17, I18, and I19 of the input data 610 and each of F1, F2, F3, F4, F5, F6, F7, F8, and F9 of the filter kernel 620 may be performed, and a value obtained by combining result values of the multiplication operations may be determined as a value of M2 of the feature map 630.

While the filter kernel 620 is moving according to the stride until the last sample of the input data 610 is reached, the convolution operation between the sample values in the input data 610 and the samples of the filter kernel 620 may be performed, and thus, the feature map 630 having a predetermined size may be obtained.

According to the disclosure, through training on the neural network 530, values of the parameters of the neural network 530, for example, the samples (for example, F1, F2, F3, F4, F5, F6, F7, F8, and F9 of the filter kernel 520) of the filter kernel 620 used by the convolutional layers of the neural network 530, may be optimized.

The convolutional layers included in the neural network 530 may perform the process according to the convolution operation described with reference to FIG. 5. However, the convolution operation described in FIG. 5 is only an example, the convolution operation is not limited thereto.

Figure 7:
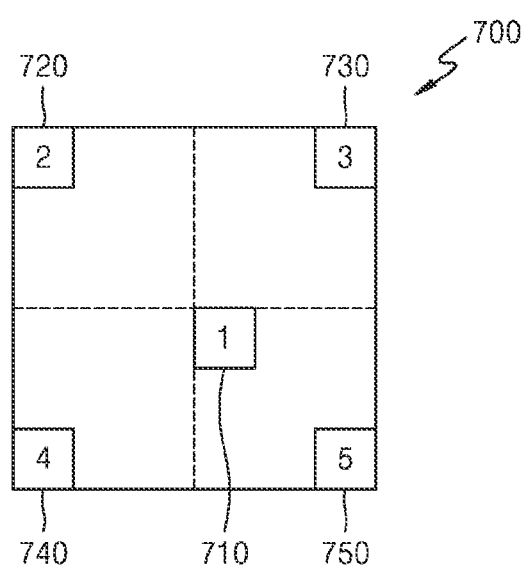
FIG. 7 is a diagram illustrating an example operation of obtaining motion information of a current block, according to various embodiments.

FIG. 7 is a diagram illustrating an example operation of obtaining motion information of a current block, according to various embodiments.

A current block 700 may obtain motion information of the current 700, based on motion information included in a plurality of predetermined positions. According to an embodiment of the disclosure, the current block 700 may determine the motion information based on sub-blocks at 5 predetermined points. Referring to FIG. 7, the current block 700 may include a first sub-block 710, a second sub-block 720, a third sub-block 730, a fourth sub-block 740, and a fifth sub-block 750. According to an embodiment of the disclosure, when the sub-block is regarding intra prediction, it may be determined that there is no motion information.

According to an embodiment of the disclosure, the motion information of the current block 700 may be determined as motion information indicating a bidirectional reference of motion information of the sub-blocks. For example, when the motion information indicates a reference reconstructed image corresponding to a temporally previous order of a current reconstructed image and a reference reconstructed image corresponding to a temporally next order of the current reconstructed image, the motion information may be regarding the bidirectional reference. An embodiment in which the motion information of the current block 700 is determined based on the bidirectional reference is to be described in greater detail below with reference to FIG. 8.

According to an embodiment of the disclosure, the motion information of the current block 700 may be determined as motion information identified first, by identifying the sub-blocks according to an order. For example, when the first sub-block 710 does not have motion information, and the second sub-block 720 has motion information, the motion information of the current block 700 may be determined as the motion information of the second sub-block 720. An embodiment in which the sub-blocks are identified according to an order and the motion information of the current block 700 may be determined as motion information identified first will be described in greater detail below with reference to FIG. 9.

According to an embodiment of the disclosure, the motion information of the current block 700 may be determined based on a difference between a reference block and the current block, the difference corresponding to the motion information of the sub-block. For example, when a difference between a first reference block and the current block, the difference corresponding to the motion information of the first sub-block, is less than a difference between the first reference block and the current block, the difference corresponding to the motion information of the second sub-block, the motion information of the first sub-block may be determined as the motion information of the current block 700.

For convenience of explanation, five points in the current block 700 are used as examples in the description. However, the number and the positions of the points may be changed.

Figure 8:
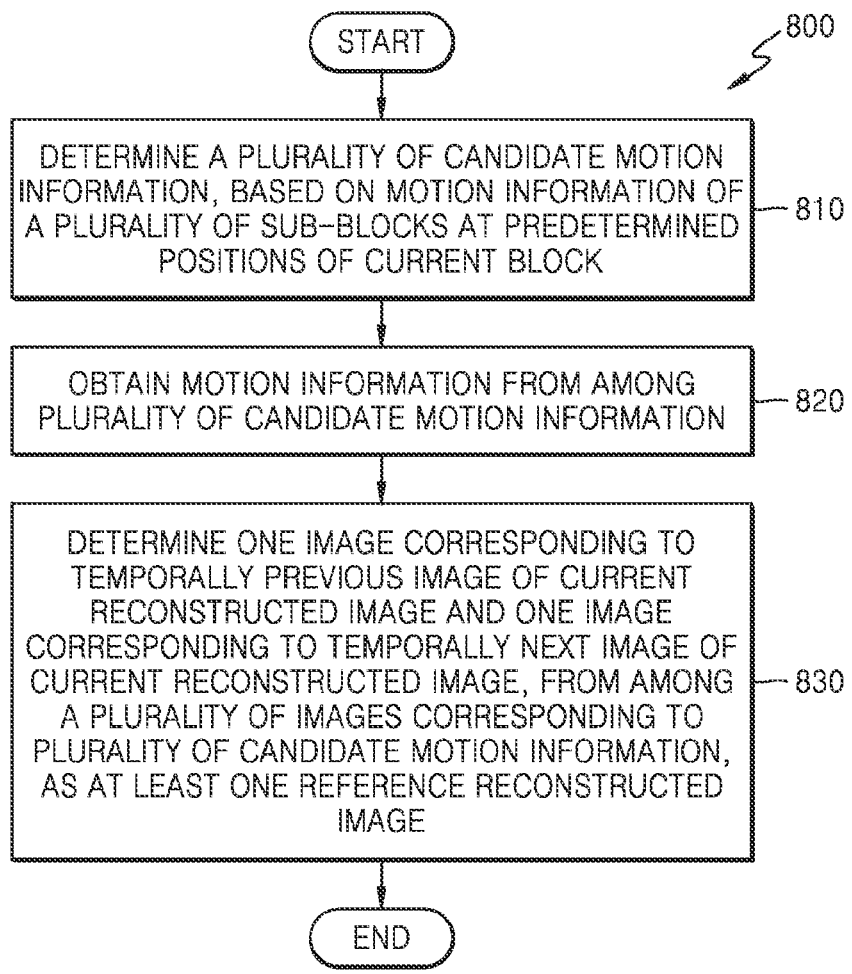
FIG. 8 is a flowchart illustrating an example method of determining a reference reconstructed image, based on motion information, according to various embodiments.

FIG. 8 is a flowchart illustrating an example method of determining a reference reconstructed image, based on motion information, according to various embodiments.

Referring to FIG. 8, a method 800 of determining a reference reconstructed image may include operation 810. According to an embodiment of the disclosure, the method 800 of determining the reference reconstructed image may be performed by the image decoding apparatus 100. According to an embodiment of the disclosure, operation 420 of FIG. 4 may include operations 810 and 820. According to an embodiment of the disclosure, operation 430 of FIG. 4 may include operation 830.

In operation 810, the method 800 of determining the reference reconstructed image may include determining a plurality of candidate motion information, based on motion information of a plurality of sub-blocks having predetermined positions of a current block. For example, the plurality of candidate motion information may be determined based on the motion information of the plurality of sub-blocks 710, 720, 730, 740, and 750 of FIG. 7.

In operation 820, the method 800 of determining the reference reconstructed image may include obtaining motion information from among the plurality of candidate motion information. According to an embodiment of the disclosure, motion information indicating a bidirectional reference may be obtained from among the plurality of candidate motion information. According to an embodiment of the disclosure, motion information that is identified first may be obtained, by identifying the plurality of candidate motion information according to an order. According to an embodiment of the disclosure, the motion information may be obtained based on a difference between a reference block and a current block, the difference corresponding to the plurality of candidate motion information.

In operation 830, the method 800 of determining the reference reconstructed image may include determining one image corresponding to a temporally previous image of a current reconstructed image and one image corresponding to a temporally next image of the current reconstructed image from among a plurality of images corresponding to the plurality of candidate motion information, as at least one reference reconstructed image.

Figure 9:
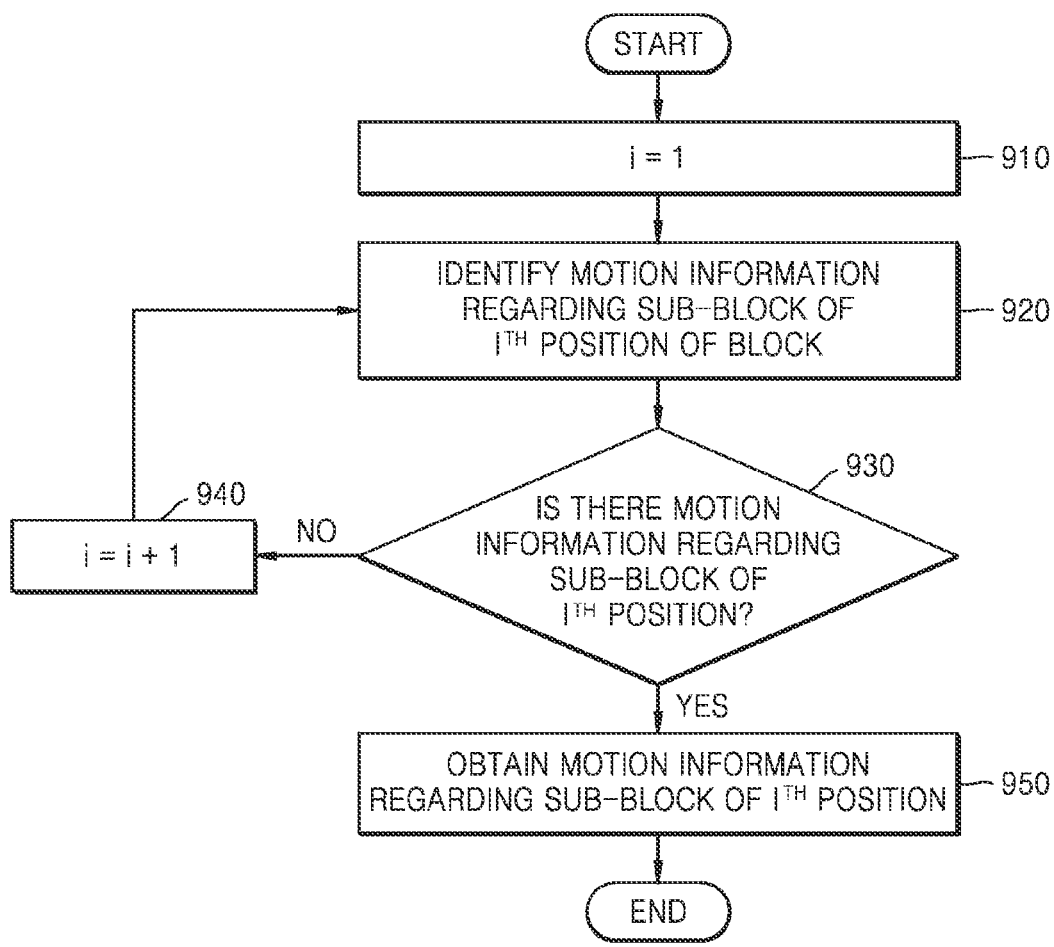
FIG. 9 is a flowchart illustrating an example process of obtaining motion information of a current block, according to various embodiments.

FIG. 9 is a flowchart illustrating an example process of obtaining motion information of a current block, according to various embodiments.

According to an embodiment of the disclosure, the motion information of the current block may be determined based on a result of identifying motion information of sub-blocks according to an order.

In operation 910, i may be determined as 1. For convenience of explanation, it is described that the sub-block exists from a first order. However, the sub-block is not limited thereto, and i may start from 0.

In operation 920, the motion information of the sub-block at an $i^{th}$ position of the current block may be identified. For example, when i is 1, the motion information of a first sub-block may be identified.

In operation 930, whether there is motion information regarding the sub-block at the $i^{th}$ position may be identified. When there is no motion information regarding the sub-block at the $i^{th}$ position, the method may proceed to operation 940. When there is motion information regarding the sub-block at the $i^{th}$ position, the method may proceed to operation 950.

In the operation 940, the value of i may be increase by 1, and the method may proceed to operation 920. That is, the motion information of a next sub-block block is to be identified in operation 920.

In an operation 950, the motion information regarding the sub-block at the $i^{th}$ position may be obtained. According to an embodiment of the disclosure, the motion information of the current block may be determined as the motion information of the sub-block at the $i^{th}$ position.

Figure 10:
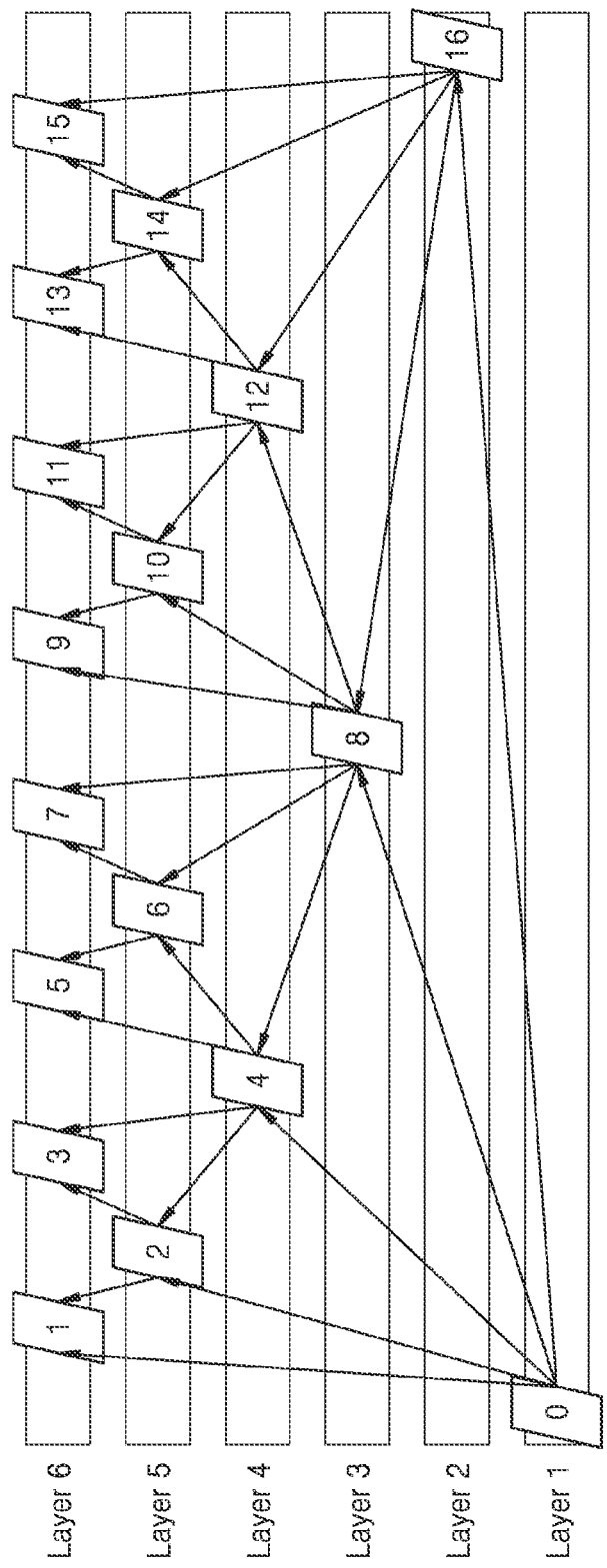
FIG. 10 is a diagram illustrating an example structure of a group of pictures (GOP) according to various embodiments.

FIG. 10 is a diagram illustrating an example configuration of a group of pictures (GOP) according to various embodiments.

Referring to FIG. 10, a plurality of images may be compressed with reference to other images in the same group. In disclosure, a picture may refer, for example, to an image or a video.

By determining a compression order of images differently from an actual order of the images, images that are temporally before and after may be used as reference images. For example, while an actual order of images may be 0, 1, 2, . . . , and 16, the compression order may be 0, 16, 8, . . . , and 15. The zeroth image may have no image for reference, and thus, an intra-screen prediction method may be used, and images next to the zeroth image may additionally use an inter-screen prediction method. Here, a structure of 16 images from a first image to a sixteenth image may be referred to as a GOP, and the corresponding GOP structure may be repeatedly used. In this case, the size of the GOP may be 16. The plurality of images included in the GOP may be separated into a plurality of layers, based on the compression order or the reference relationship. For example, the 8th, 12th, and 14th images referring to the 16th image may be determined to be in higher layers than the 16th image.

According to an embodiment of the disclosure, when an image is compressed, a quantization parameter (QP) having a different value for each image may be used, in order to increase the compression efficiency. For example, an image referred to may be made to have improved quality by decreasing the QP, in order to increase the reference efficiency, and an image referring to the image referred to may be made to have a less bitrate by increasing the QP. As an image is in a lower layer, the number of references made thereto may be increased, and thus, the image may use a decreased QP, and an image in a higher layer may use a relatively increased QP. Images in a highest layer are not referred to for compression of other images, and thus, may use a highest QP. According to the embodiment described above, the image referring to the image referred to may take high quality of the image referred to, and thus, the efficiency of the image compression may be increased.

Figure 11:
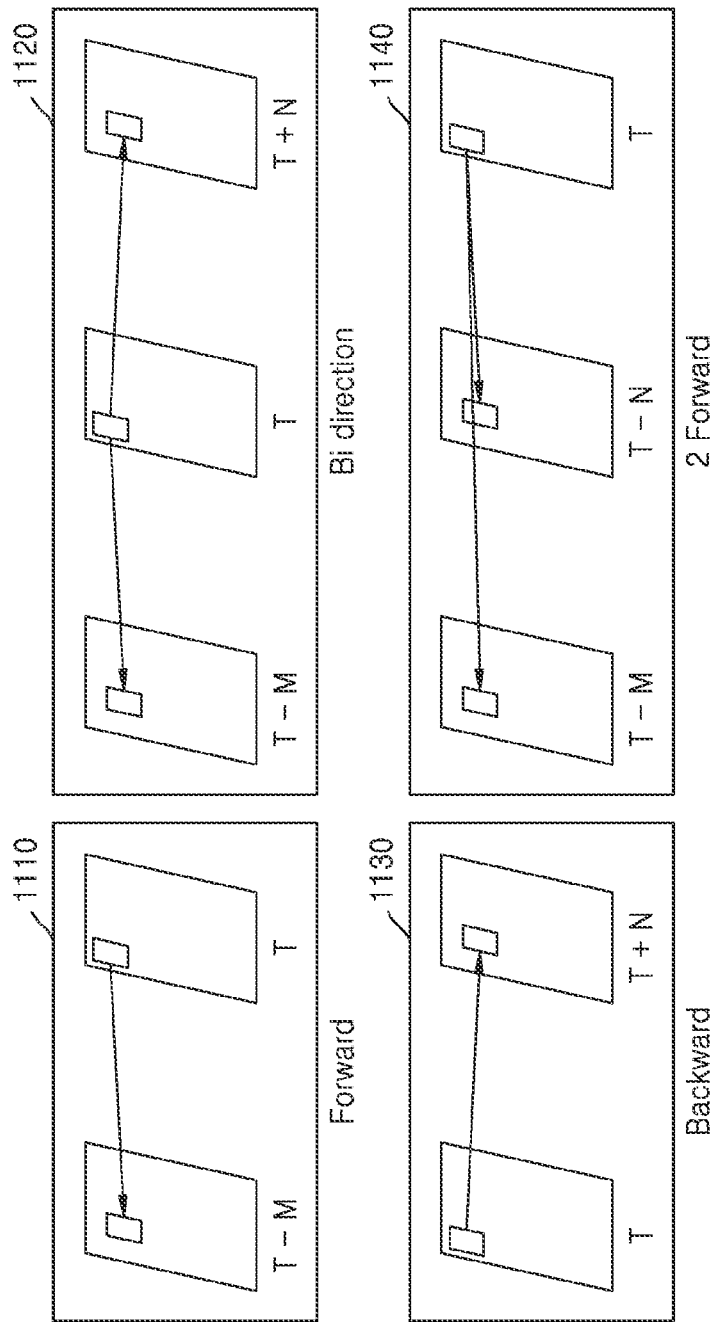
FIG. 11 is a diagram illustrating an example relationship between a current block and a reference block, according to various embodiments.

FIG. 11 is a diagram illustrating an example relationship between a current block and a reference block, according to various embodiments.

Referring to FIG. 11, the relationship between the current block and the reference block may include a forward reference, a bidirectional reference, a backward reference, or a 2 forward reference.

According to an embodiment of the disclosure, the relationship between the current block and the reference block may be a forward reference 1110. When a time order of a current reconstructed image is T, a time order of a reference reconstructed image may be T−M, which is before the current reconstructed image.

According to an embodiment of the disclosure, the relationship between the current block and the reference block may be a bidirectional reference 1120. When the time order of the current reconstructed image is T, the time order of the reference reconstructed images may be T−M, which is before the current reconstructed image, and T+N, which is after the current reconstructed image.

According to an embodiment of the disclosure, the relationship between the current block and the reference block may be a backward reference 1130. When the time order of the current reconstructed image is T, the time order of a reference reconstructed image may be T+N, which is after the current reconstructed image.

According to an embodiment of the disclosure, the relationship between the current block and the reference block may be a 2 forward reference 1140. When the time order of the current reconstructed image is T, the time order of the reference reconstructed image may be T−M and T−N, which are before the current reconstructed image.

According to an embodiment of the disclosure, the relationship between the current block and the reference block may be a 2 backward reference (not shown). When the time order of the current reconstructed image is T, the time order of the reference reconstructed image may be T+M and T+N, which are after the current reconstructed image.

According to an embodiment of the disclosure, an image decoding apparatus may determine motion information, based on a relationship between a current image and a reference image. For example, from among motion information of a plurality of sub-blocks of the current block, motion information in which the current image and the reference image satisfy a predetermined condition may be obtained. According to an embodiment of the disclosure, an embodiment in which motion information is obtained when the current image and the reference image are a bidirectional reference will be described in greater detail below with reference to FIG. 12.

According to an embodiment of the disclosure, a reference reconstructed image may be determined from among images in a lower layer than a current reconstructed image in the GOP. According to an embodiment of the disclosure, the reference reconstructed image may be determined from among images in the lowest layer in the GOP. For example, only a zeroth image in a layer 1 may be determined as the reference reconstructed image.

According to an embodiment of the disclosure, whether to down-size each of a plurality of images in the GOP may be determined. According to an embodiment of the disclosure, an image using intra-screen prediction may not be down-sized and may be decoded in an original size, and other images may be down-sized and decoded. According to an embodiment of the disclosure, images using the intra-screen prediction and images included in a specific layer (e.g., a lowest layer) may not be down-sized and may be decoded in an original size, and other images may be down-sized and decoded.

Figure 12:
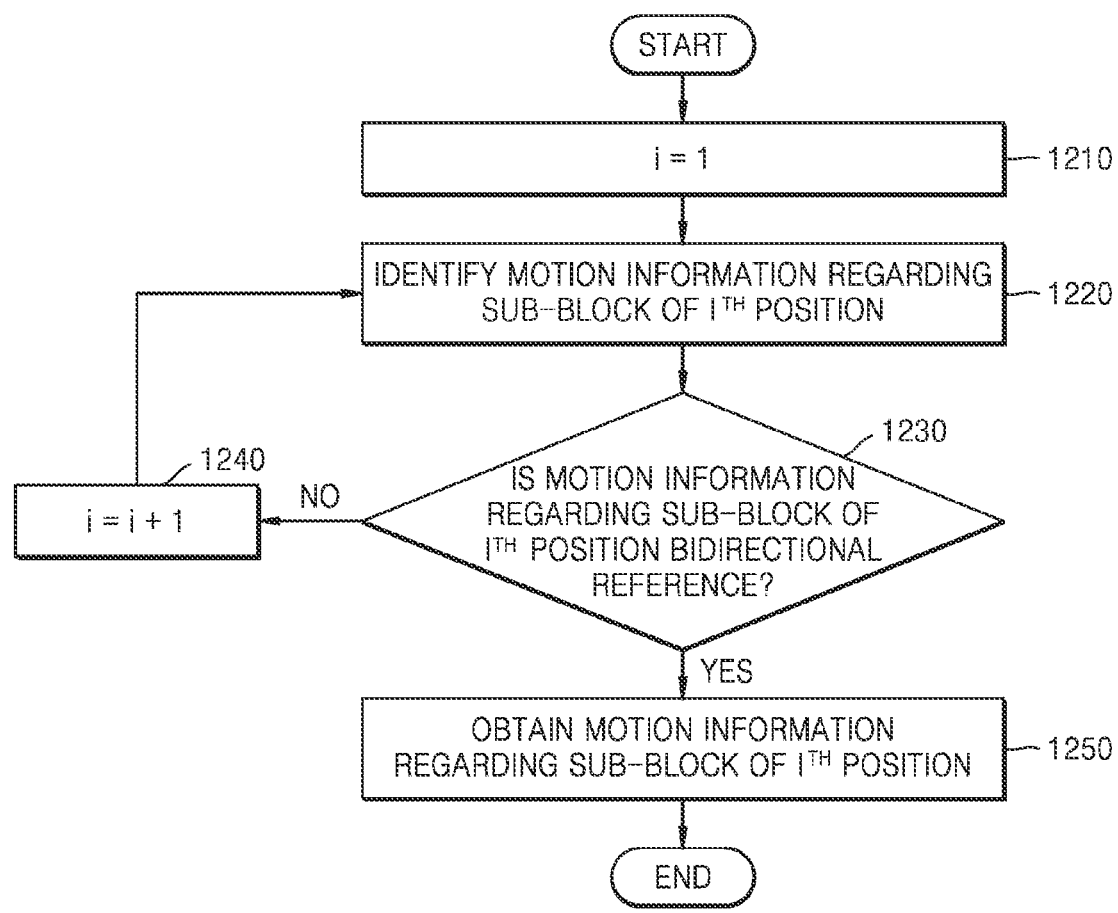
FIG. 12 is a flowchart illustrating an example process of obtaining motion information of a current block, according to various embodiments.

FIG. 12 is a flowchart illustrating an example process of obtaining motion information of a current block, according to various embodiments.

According to an embodiment of the disclosure, the motion information of the current block may be determined based on a result of identifying motion information of sub-blocks according to an order.

Operations 1210, 1220, 1240, and 1250 may correspond to operations 910, 920, 940, and 950 of FIG. 9.

In operation 1210, i may be determined as 1. In operation 1220, motion information regarding a sub-block at an $i^{th}$ position of the current block may be identified.

In operation 1230, whether the motion information regarding the sub-block at the $i^{th}$ position is a bidirectional reference may be identified. When the motion information regarding the sub-block at the $i^{th}$ position does not indicate the bidirectional reference, the process may proceed to operation 1240. When the motion information regarding the sub-block at the $i^{th}$ position indicates the bidirectional reference, the process may proceed to operation 1250.

In operation 1240, the value of i may be increase by 1, and the process may proceed to operation 1220. That is, the motion information of a next sub-block is to be identified in operation 1220.

In an operation 1250, the motion information regarding the sub-block at the $i^{th}$ position may be obtained. According to an embodiment of the disclosure, the motion information of the current block may be determined as the motion information regarding the sub-block at the $i^{th}$ position.

In FIG. 12, the motion information may be obtained based on the example in which the motion information indicates the bidirectional reference in operation 1230. However, it is not limited thereto, and the motion information may be obtained when the motion information indicates a forward reference, a backward reference, a 2 forward reference, or a 2 backward reference.

Figure 13:
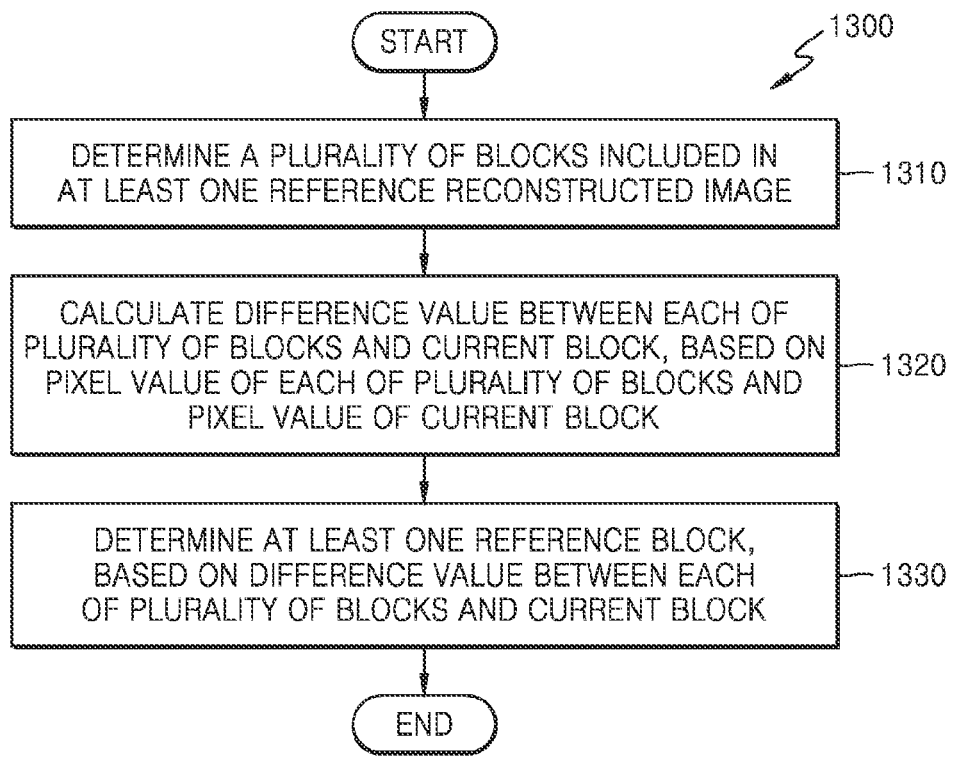
FIG. 13 is a flowchart illustrating an example method of determining a reference block, according to various embodiments.

FIG. 13 is a flowchart illustrating an example method of determining a reference block, according to various embodiments.

Referring to FIG. 13, a method 1300 of determining a reference block may start with operation 1310. The method 1300 of determining the reference block may be performed by the decoding apparatus 100.

In operation 1310, the method 1300 of determining the reference block may include determining a plurality of blocks included in at least one reference reconstructed image. According to an embodiment of the disclosure, the plurality of blocks may be a plurality of blocks included in one reference image. The plurality of blocks may be split from a whole image or split from a predetermined area. According to an embodiment of the disclosure, the plurality of blocks may be reference blocks corresponding to a plurality of reference reconstructed images.

In operation 1320, the method 1300 of determining the reference block may include calculating a difference value, based on a pixel value of each of the plurality of blocks and a pixel value of the current block. According to an embodiment of the disclosure, the difference value may be calculated based on the pixel value of each of the plurality of blocks and the pixel value of the current block using a sum of absolute differences (SAD), a sum of squared errors (SSE), or a mean square error (MSE) method.

In operation 1330, the method 1300 of determining the reference block may include determining the at least one reference block, based on the difference value. According to an embodiment of the disclosure, a block having a least difference value from the current block may be determined as the reference block.

Figure 14:
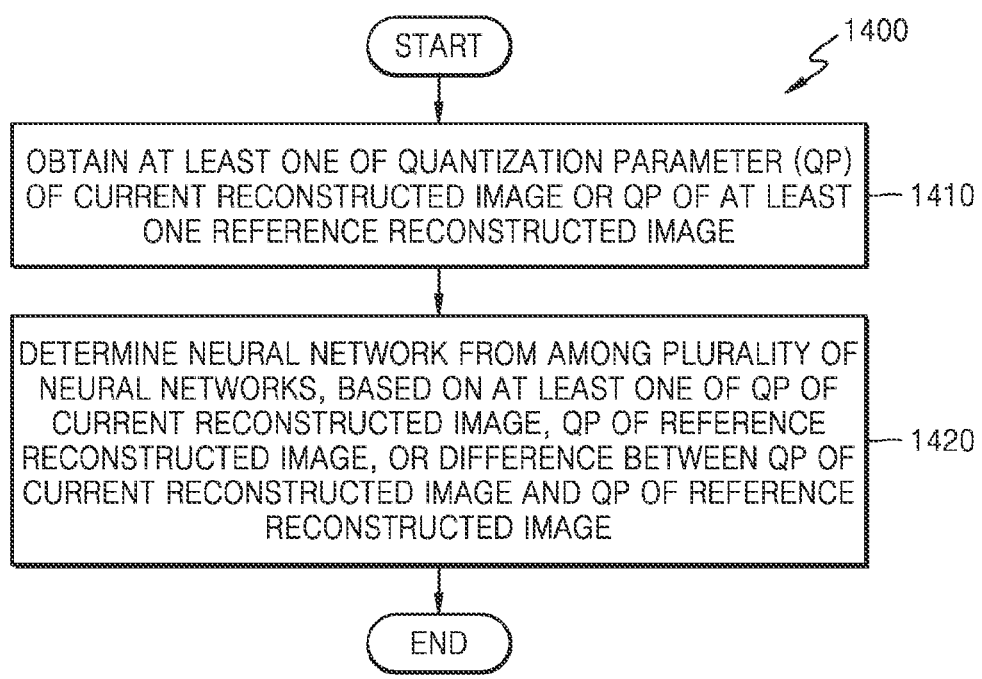
FIG. 14 is a flowchart illustrating an example method of determining a neural network, according to various embodiments.

FIG. 14 is a flowchart illustrating an example method of determining a neural network, according to various embodiments.

Referring to FIG. 14, a method 1400 of determining a neural network may start with operation 1410. The method 1400 of determining the neural network may be performed by the decoding apparatus 100.

In operation 1410, the method 1400 of determining the neural network may include obtaining at least one of a quantization parameter (QP) of a current reconstructed image or a quantization parameter of at least one reference reconstructed image.

In operation 1420, the method 1400 of determining the neural network may include determining the neural network from among a plurality of neural networks, based on at least one of the quantization parameter of the current reconstructed image, the quantization parameter of the reference reconstructed image, or a difference between the quantization parameter of the current reconstructed image and the quantization parameter of the reference reconstructed image.

According to an embodiment of the disclosure, different models may be implemented as the neural network, according to at least one of motion information of a current block, a size of a motion vector, a reference reconstructed image, or a temporal difference between the current reconstructed image and the reference reconstructed image.

Image quality may further be improved by differently implementing the neural network model used to apply a filter, according to a predetermined condition.

Figure 15:
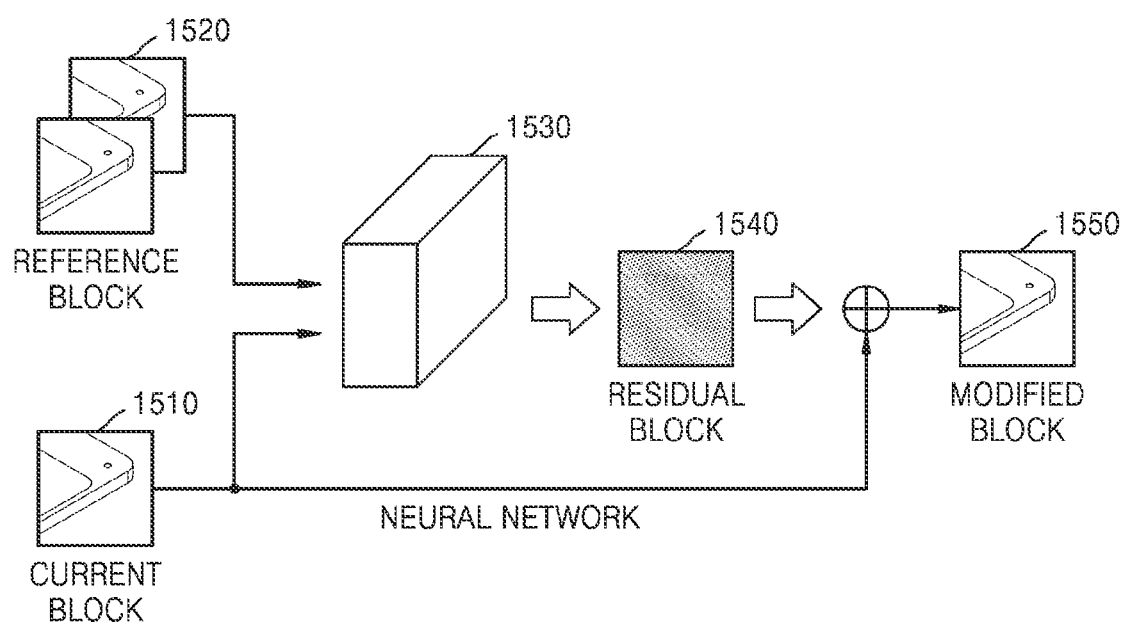
FIG. 15 is a diagram illustrating an example method of training a neural network, according to various embodiments.

FIG. 15 is a diagram illustrating an example method of training a neural network, according to various embodiments.

Referring to FIG. 15, a neural network 1530 may input a current block 1510 and a reference block 1520 and may output a residual block 1540. A modified block 1550 may be generated by adding the current block 1510 with the residual block 1540.

According to an embodiment of the disclosure, the neural network 1530 may be trained based on training data including an original image and an encoded image and a decoded image of the original image. By encoding and decoding the original image, training data corresponding to the current block 1510 may be generated. Based on motion information of the training data corresponding to the current block 1510, training data corresponding to the reference block 1510 may be generated. Based on the training data, the neural network 1530 may be trained to reduce an error between a predicted block and a block of the original image.

Figure 16:
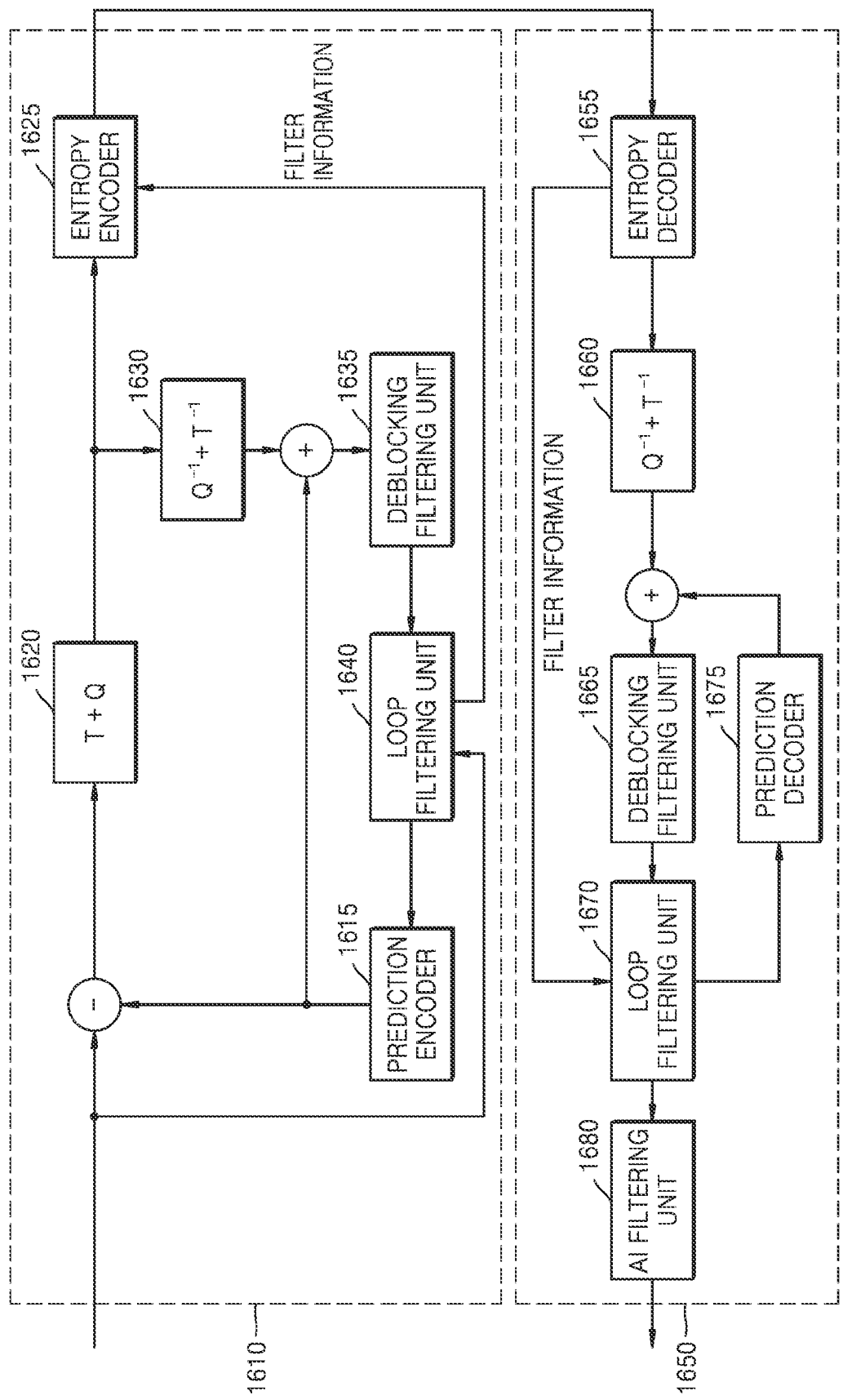
FIG. 16 is a diagram illustrating an example configuration of an encoding apparatus and a decoding apparatus, according to various embodiments.

FIG. 16 is a diagram illustrating an example configuration of an encoding apparatus and a decoding apparatus, according to various embodiments.

Referring to FIG. 16, an encoding apparatus 1610 may transmit a bitstream generated by encoding an image, to a decoding apparatus 1650, and the decoding apparatus 1650 may receive and decode the bitstream to reconstruct an image.

In detail, in the encoding apparatus 1610, a prediction encoder 1615 may output a prediction block through inter prediction and intra prediction, and a transformer and quantizer 1620 may transform and quantize residual samples of a residual block between the prediction block and a current block and output a quantized transform coefficient. An entropy encoder 1625 may output the quantized transform coefficient as a bitstream by encoding the quantized transform coefficient.

The quantized transform coefficient may be reconstructed as a residual block including residual samples of a spatial domain, through an inverse quantizer and inverse transformer 1630. A reconstructed block in which the prediction block is added to the residual block may be output as a filtered block through a deblocking filtering unit 1635 and a loop filtering unit 1640. A reconstructed image including the filtered block may be used by the prediction encoder 1615 as a reference image of a next input image.

The bitstream received by the decoding apparatus 1650 may be reconstructed as a residual block including residual samples of a spatial domain, through an entropy decoder 1655 and an inverse quantizer and inverse transformer 1660. A reconstructed block may be generated by adding a prediction block output from a prediction decoder 1675 to the residual block, and the reconstructed block may be filtered through a deblocking filtering unit 1665 and a loop filtering unit 1670. A reconstructed image including the block filtered through the deblocking filtering unit 1665 and the loop filtering unit 1670 may be used by the prediction decoder 1675 as a reference image regarding a next image. The block filtered through the deblocking filtering unit 1665 and the loop filtering unit 1670 may be output through an AI filter 1650

The loop filtering unit 1640 of the encoding apparatus 1610 may perform loop filtering using filter information input according to a user input or a system configuration. The filter information used by the loop filtering unit 1640 may be transmitted to the decoding apparatus 1650 through the entropy encoder 1625. The loop filtering unit 1670 of the decoding apparatus 1650 may perform loop filtering based on filter information input from the entropy decoder 1655.

According to an embodiment of the disclosure, FIG. 16 illustrates a method, performed by the AI filtering unit 1680, of processing an image according to a post-processing method, and hereinafter, an embodiment in which the AI filtering unit 1680 is used according to an in-loop method is described in greater detail below with reference to FIG. 17.

FIG. 17 is a diagram illustrating an example configuration of an encoding apparatus and a decoding apparatus, according to various embodiments.

Referring to FIG. 17, an encoding apparatus 1710 may transmit a bitstream generated by encoding an image to a decoding apparatus 1750, and the decoding apparatus 1750 may receive and decode the bitstream to reconstruct an image.

A prediction encoder 1715, a transformer and quantizer 1720, an entropy encoder 1725, and an inverse quantizer and inverse transformer 1730 of the encoding apparatus 1710 may be understood with reference to the prediction encoder 1615, the transformer and quantizer 1620, the entropy encoder 1625, and the inverse quantizer and inverse transformer 1630 of the encoding apparatus 1610 of FIG. 16, and thus, their descriptions may not be repeated here.

A transform coefficient quantized from the transformer and quantizer 1720 of the encoding apparatus may be reconstructed as a residual block including residual samples of a spatial domain, through the inverse quantizer and inverse transformer 1730. A reconstructed block in which a prediction block is added to the residual block may be output as a filtered block through a filtering unit 1735. The filtering unit 1735 may include at least one of a deblocking filter, a loop filter, or an AI filter. A reconstructed image including the filtered block may be used by the prediction encoder 1715 as a reference image of a next input image.

An entropy decoder 1755, an inverse quantizer and inverse transformer 1760, and a prediction decoder 1775 of the decoding apparatus 1750 may be understood with reference to the entropy decoder 1655, the inverse quantizer and inverse transformer 1660, and the prediction decoder 1675 of the decoding apparatus 1650 of FIG. 16, and thus, their descriptions may not be repeated here.

A reconstructed block may be generated by adding a prediction block output from the prediction decoder 1775 and a residual block reconstructed from the inverse quantizer and inverse transformer 1760 of the decoding apparatus 1750, and the reconstructed block may be filtered through a filtering unit 1765. The filtering unit 1765 may include at least one of a deblocking filter, a loop filter, or an AI filter.

A reconstructed image including the filtered block may be used by the prediction decoder 1775 as a reference image regarding a next image.

Types and orders of filters included in the filtering unit 1735 of the encoding apparatus 1710 or the filtering unit 1765 of the decoding apparatus 1750 may be changed according to an appropriate design. However, the types and the orders of the filters may be the same between the filtering unit 1735 of the encoding apparatus 1710 and the filtering unit 1765 of the decoding apparatus 1750 may be the same.

As illustrated in FIG. 17, when an AI filter is designed according to an in-loop method in the encoding apparatus 1710 and the decoding apparatus 1750, the filtered image may be used as a reference image in a compression/decompression process of the filtered image, and thus, the compression performance may further be increased.

According to an embodiment of the disclosure, the AI filter included in the filtering units 1735 and 1765 may be the AI filter 140 of FIG. 1.

Figure 18A:
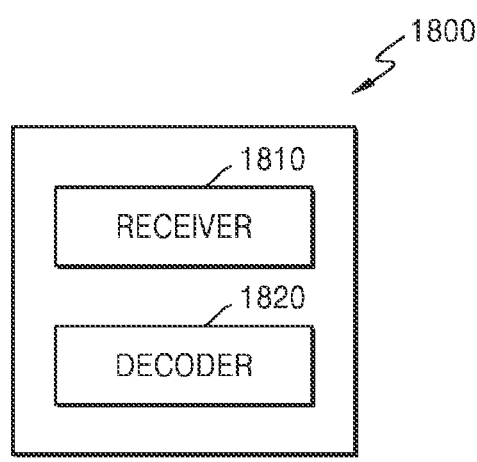
FIG. 18A is a block diagram illustrating an example configuration of an image decoding apparatus, according to various embodiments.

FIG. 18A is a block diagram illustrating an example configuration of an image decoding apparatus, according to various embodiments.

Referring to FIG. 18A, an image decoding apparatus 1800 according to an embodiment of the disclosure may include a receiver 1810 and a decoder 1820. The receiver 1810 and the decoder 1820 may include at least one processor (e.g., including processing circuitry). The processor of the receiver 1810 and/or the decoder 1820 according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions The receiver 1810 and the decoder 1820 may also include a memory storing instructions to be executed by the at least one processor. According to an embodiment of the disclosure, the image decoding apparatus 1800 may be the image decoding apparatus 100 of FIG. 1.

The receiver 1810 may receive a bitstream. The bitstream includes information regarding encoding of an image via an image encoding apparatus 1900 to be described in greater detail below with reference to FIGS. 19A and 19B. The bitstream may be transmitted from the image encoding apparatus 1900. The image encoding apparatus 1900 and the image decoding apparatus 1800 may be connected to each other by wire or wirelessly, and the receiver 1810 may receive the bitstream by wire or wirelessly. The receiver 1810 may receive the bitstream from a storage medium, such as an optical medium or a hard disk.

The decoder 1820 may reconstruct an image based on information obtained from the received bitstream. The decoder 1820 may obtain, from the bitstream, a syntax element for reconstructing the image. The decoder 1820 may reconstruct the image based on the syntax element.

The decoder 1820 may entropy-decode the syntax elements obtained from the bitstream. According to an embodiment of the disclosure, the decoder 1820 may obtain motion information regarding inter prediction of a current block of a current reconstructed image. The decoder 1820 may determine, based on the motion information, at least one reference reconstructed image regarding the current reconstructed image. The decoder 1820 may determine at least one reference block, based on the motion information and the at least one reference reconstructed image. The decoder 1820 may input the current block and the at least one reference block to a neural network and may obtain an output block corresponding to the current block. The decoder 1820 may obtain a modified current reconstructed image, based on the output block.

Figure 18B:
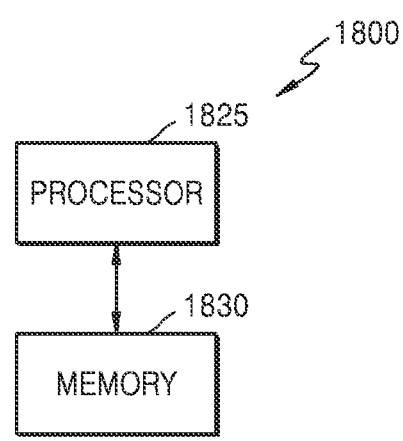
FIG. 18B is a block diagram illustrating an example configuration of an image decoding apparatus, according to various embodiments.

FIG. 18B is a block diagram illustrating an example configuration of an image decoding apparatus, according to various embodiments.

Referring to FIG. 18B, an image decoding apparatus 1800 according to an embodiment of the disclosure may include a memory 1830 and at least one processor (e.g., including processing circuitry) 1825 connected to the memory 1830. Operations of the image decoding apparatus 1800 according to an embodiment of the disclosure may be performed by separate processors or may be performed according to control by a central processor. The memory 1830 of the image decoding apparatus 1800 may store data received from the outside and data generated by the processor. According to an embodiment of the disclosure, the image decoding apparatus 1800 may be the image decoding apparatus 100 of FIG. 1. The at least one processor 1825 according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The memory 1830 of the image decoding apparatus 1800 according to an embodiment of the disclosure may include at least one instruction executable by at least one processor 1825. When the at least one instruction is executed, the at least one instruction may be configured for the at least one processor 1825 to obtain motion information regarding inter prediction of a current block of a current reconstructed image. When executed, the at least one instruction may be configured for the at least one processor 1825 to determine, based on the motion information, at least one reference reconstructed image regarding the current reconstructed image. When executed, the at least one instruction may be configured for the at least one processor 1825 to determine, based on the motion information and the at least one reference reconstructed image, at least one reference block. When executed, the at least one instruction may be configured for the at least one processor 1825 to obtain, by inputting the current block and the at least one reference block to a neural network, an output block corresponding to the current block. When executed, the at least one instruction may be configured for the at least one processor 1825 to obtain, based on the output block, a modified current reconstructed image.

Figure 19A:
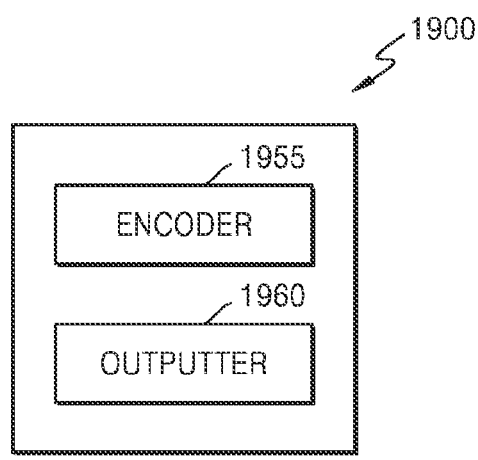
FIG. 19A is a block diagram illustrating an example configuration of an image encoding apparatus, according to various embodiments.
Figure 19B:
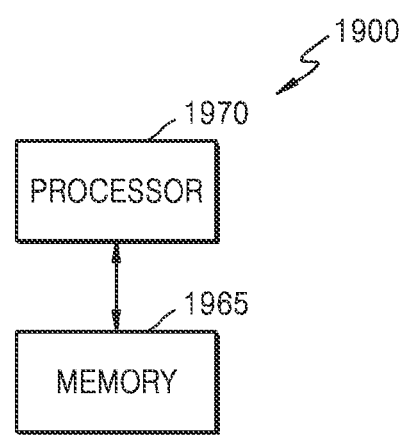
FIG. 19B is a block diagram illustrating an example configuration of an image encoding apparatus, according to various embodiments.

The image processing method, the image encoding method, and the image decoding method according to various embodiments may be performed by the decoder 1820 of the image decoding apparatus 1800 of FIG. 18A and the encoder 1955 of the image encoding apparatus 1950 of FIG. 19A or the processor 1825 of the image decoding apparatus 1800 illustrated in FIG. 18B and the processor 1970 of the image encoding apparatus 1950 illustrated in FIG. 19B.

FIG. 19A is a block diagram illustrating an example configuration of an image encoding apparatus, according to various embodiments.

Referring to FIG. 19A, an image encoding apparatus 1900 according to an embodiment of the disclosure may include an encoder 1955 and an outputter 1960, each of which may include various processing circuitry and/or executable program instructions.

The encoder 1955 and the outputter 1960 may include at least one processor. The encoder 1955 and the outputter 1960 may include a memory storing instructions to be executed by the at least one processor. The encoder 1955 and the outputter 1960 may be realized as separate hardware or the encoder 1955 and the outputter 1960 may be included in the same hardware. The processor according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The encoder 1955 may obtain a prediction block of a current block according to a prediction mode of the current block and may encode the current block and the prediction block by transforming and quantizing a residual, which is a difference value of the current block and the prediction block. The outputter 1960 may generate a bitstream including information regarding the prediction mode of the current block, other structural information for determining data units having hierarchical split shapes, etc. and may output the bitstream.

The encoder 1955 may determine motion information regarding inter prediction of the current block of a current reconstructed image. The encoder 1955 may determine, based on the motion information, at least one reference reconstructed image regarding the current reconstructed image. The encoder 1955 may determine at least one reference block, based on the motion information and the at least one reference reconstructed image. The encoder 1955 may input the current block and the at least one reference block to a neural network and may generate an output block corresponding to the current block. The encoder 1955 may generate a modified current reconstructed image, based on the output block.

FIG. 19B is a block diagram illustrating an example configuration of an image encoding apparatus, according to various embodiments.

An image encoding apparatus 1950 according to an embodiment of the disclosure may include a memory 1965 and at least one processor (e.g., including processing circuitry) 1970 connected to the memory 1965. Operations of the image encoding apparatus 150 according to an embodiment of the disclosure may be performed by separate processors or may be performed according to control by a central processor. The processor 1970 according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The memory 1965 of the image encoding apparatus 150 may store data received from the outside and data generated by the processor.

The memory 1965 of the image encoding apparatus 150 according to various embodiments may include at least one instruction configured to be executable by the at least one processor 1970. When the at least one instruction is executed, the at least one instruction may be configured for the at least one processor 1970 to determine motion information regarding inter prediction of a current block of a current reconstructed image. When the at least one instruction is executed, the at least one instruction may be configured for the at least one processor 1970 to determine, based on the motion information, at least one reference reconstructed image regarding the current reconstructed image. When the at least one instruction is executed, the at least one instruction may be configured for the at least one processor 1970 to determine, based on the motion information and the at least one reference reconstructed image, at least one reference block. When the at least one instruction is executed, the at least one instruction may be configured for the at least one processor 1970 to generate, by inputting the current block and the at least one reference block to a neural network, an output block corresponding to the current block. When the at least one instruction is executed, the at least one instruction may be configured for the at least one processor 1970 to generate, based on the output block, a modified current reconstructed image.

Figure 20:
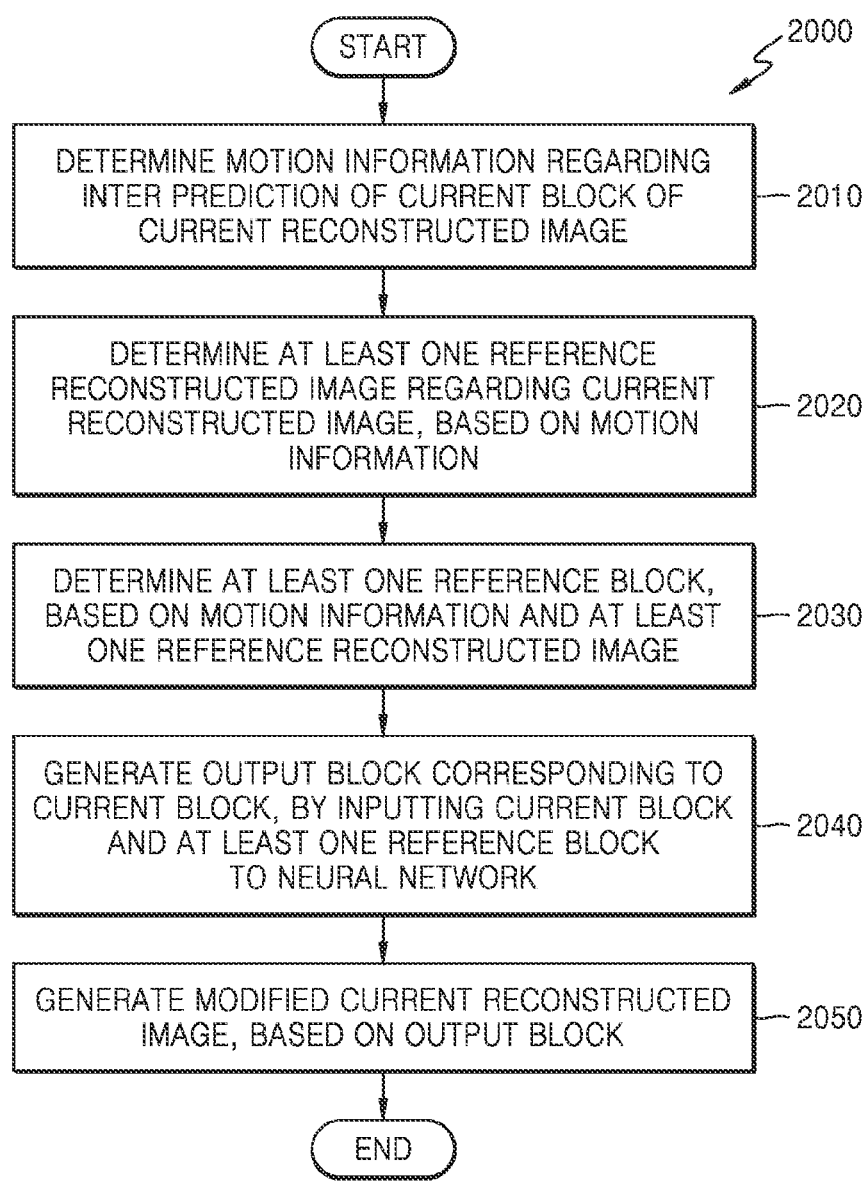
FIG. 20 is a flowchart illustrating an example AI-based image encoding method according to various embodiments.

FIG. 20 is a flowchart illustrating an example AI-based image encoding method according to various embodiments.

Referring to FIG. 20, an image encoding method 2000 may start with operation 2010. According to an embodiment of the disclosure, the image processing method 2000 may be performed by the image encoding apparatus 1900 of FIG. 19.

In operation 2010, the image encoding method 2000 may include determining motion information regarding inter prediction of a current block of a current reconstructed image. According to an embodiment of the disclosure, the motion information of the current block may be motion information used for the inter prediction. According to an embodiment of the disclosure, the motion information may include at least one of information of a reference reconstructed image or information regarding a motion vector. According to an embodiment of the disclosure, the motion information of the current block of the current reconstructed image may be transmitted from an image encoding apparatus to an image decoding apparatus.

In operation 2020, the image encoding method 2000 may include determining, based on motion information, at least one reference reconstructed image regarding the current reconstructed image. According to an embodiment of the disclosure, the information regarding the at least one reference reconstructed image may be transmitted from the image encoding apparatus to the image decoding apparatus.

In operation 2030, the image encoding method 2000 may include determining at least one reference block based on the motion information and the at least one reference reconstructed image. According to an embodiment of the disclosure, the motion information may include information regarding a position of a reference block in the reference reconstructed image. According to an embodiment of the disclosure, the information regarding the reference block may be transmitted from the image encoding apparatus to the image decoding apparatus.

In operation 2040, the image encoding method 2000 may include inputting the current block and the at least one reference block to a neural network and generating an output block corresponding to the current block. According to an embodiment of the disclosure, the neural network may be trained to reduce an error between the current block and a block of an original image corresponding to the current block.

In operation 2050, the image encoding method 2000 may include generating a modified current reconstructed image, based on the output block.

According to an example embodiment of the disclosure, there may be provided an image processing method for AI-based filtering. The image processing method may include: obtaining motion information regarding inter prediction of a current block of a current reconstructed image; determining, based on the motion information, at least one reference reconstructed image regarding the current reconstructed image; determining, based on the motion information and the at least one reference reconstructed image, at least one reference block; obtaining, by inputting the current block and the at least one reference block to a neural network, an output block corresponding to the current block; obtaining, based on the output block, a modified current reconstructed image. The neural network may be trained using training data including the current block, the at least one reference block, and the output block, to reduce an error between the current block and an original block corresponding to the current block.

According to an example embodiment of the disclosure, the method may further include determining a plurality of candidate motion information, based on motion information of a plurality of sub-blocks at specified positions of the current block. The method may further include obtaining the motion information from among the plurality of candidate motion information.

According to an example embodiment of the disclosure, the method may further include: determining one image corresponding to a temporally previous image of the current reconstructed image and an image corresponding to a temporally next image of the current reconstructed image, from among a plurality of images corresponding to the plurality of candidate motion information, as the at least one reference reconstructed image.

According to an example embodiment of the disclosure, the motion information may include information regarding a reference image and a motion vector. The reference reconstructed image may be determined based on the information regarding the reference image. The reference block may be determined based on the motion vector and the reference reconstructed image.

According to an example embodiment of the disclosure, the method may include determining a plurality of blocks included in the at least one reference reconstructed image. The method may include calculating a difference value between each of the plurality of blocks and the current block, based on a pixel value of each of the plurality of blocks and a pixel value of the current block. The method may include determining the at least one reference block, based on the difference value between each of the plurality of blocks and the current block.

According to an example embodiment of the disclosure, the method may include calculating the difference value, based on the pixel value of each of the plurality of blocks and the pixel value of the current block, using a method of at least one of a sum of absolute differences (SAD), a sum of squared errors (SSE), or a mean square error (MSE).

According to an example embodiment of the disclosure, the method may include obtaining at least one of a quantization parameter (QP) of the current reconstructed image or a quantization parameter of the at least one reference reconstructed image. The method may include determining the neural network from among a plurality of neural networks, based on at least one of the quantization parameter of the current reconstructed image, the quantization parameter of the reference reconstructed image, or a difference between the quantization parameter of the current reconstructed image and the quantization parameter of the reference reconstructed image.

According to an example embodiment of the disclosure, the quantization parameter of the at least one reference reconstructed image may be greater than the quantization parameter of the current reconstructed image.

According to an example embodiment of the disclosure, the at least one reference reconstructed image and the current reconstructed image may be included in the same GOP.

According to an example embodiment of the disclosure, the at least one reference reconstructed image may be decoded previously to the current reconstructed image.

According to an example embodiment of the disclosure, the image processing method may further include performing upscaling for increasing a resolution of the current reconstructed image. For example, when the resolution of the current reconstructed image is N×N, a resolution of the upscaled current reconstructed image may be kN×kN (k is a real number greater than 1). The image processing method may further include obtaining motion information regarding inter prediction of a current block of the upscaled current reconstructed image. The upscaled current reconstructed image may have the same resolution as the reference image.

According to an example embodiment of the disclosure, there may be provided an image processing apparatus for AI-based filtering. The image processing apparatus for AI-based filtering may include: a memory storing at least one instruction and at least one processor, comprising processing circuitry, individually and/or collectively configured to: obtain motion information regarding inter prediction of a current block of a current reconstructed image; determine, based on the motion information, at least one reference reconstructed image regarding the current reconstructed image; determine, based on the motion information and the at least one reference reconstructed image, at least one reference block; obtain an output block corresponding to the current block, by inputting the current block and the at least one reference block to a neural network; obtain a modified current reconstructed image, based on the output block. The neural network may be trained using training data including the current block, the at least one reference block, and the output block, in order to reduce an error between the current block and an original block corresponding to the current block.

According to an example embodiment of the disclosure, at least one processor may, individually and/or collectively, be configured to: determine a plurality of candidate motion information, based on motion information of a plurality of sub-blocks at predetermined positions of the current block; and obtain the motion information from among the plurality of candidate motion information.

According to an example embodiment of the disclosure, at least one processor may, individually and/or collectively, be configured to determine one image corresponding to a temporally previous image of the current reconstructed image and an image corresponding to a temporally next image of the current reconstructed image, from among a plurality of images corresponding to the plurality of candidate motion information, as the at least one reference reconstructed image.

According to an example embodiment of the disclosure, the motion information may include information regarding a reference image and a motion vector. The reference reconstructed image may be determined based on the information regarding the reference image. The reference block may be determined based on the motion vector and the reference reconstructed image.

According to an example embodiment of the disclosure, at least one processor may, individually and/or collectively, be configured to: determine a plurality of blocks included in the at least one reference reconstructed image; calculate a difference value between each of the plurality of blocks and the current block, based on a pixel value of each of the plurality of blocks and a pixel value of the current block; and determine the at least one reference block, based on the difference value between each of the plurality of blocks and the current block.

According to an example embodiment of the disclosure, at least one processor may, individually and/or collectively, be configured to calculate the difference value, based on the pixel value of each of the plurality of blocks and the pixel value of the current block, using a method of at least one of a sum or absolute differences (SAD), a sum or squared errors (SSE), or a mean square error (MSE).

According to an example embodiment of the disclosure, at least one processor may, individually and/or collectively, be configured to: obtain at least one of a quantization parameter (QP) of the current reconstructed image or a quantization parameter of the at least one reference reconstructed image; and determine the neural network from among a plurality of neural networks, based on at least one of the quantization parameter of the current reconstructed image, the quantization parameter of the reference reconstructed image, or a difference between the quantization parameter of the current reconstructed image and the quantization parameter of the reference reconstructed image.

According to an example embodiment of the disclosure, the quantization parameter of the at least one reference reconstructed image may be greater than the quantization parameter of the current reconstructed image.

According to an example embodiment of the disclosure, the at least one reference reconstructed image and the current reconstructed image may be included in the same GOP.

According to an example embodiment of the disclosure, the at least one reference reconstructed image may be decoded previously to the current reconstructed image.

According to an example embodiment of the disclosure, at least one processor may, individually and/or collectively, be configured to: perform upscaling for increasing a resolution of the current reconstructed image; and obtain motion information regarding inter prediction of a current block of the upscaled current reconstructed image, wherein upscaled current reconstructed image may have the same resolution as the reference image.

According to an example embodiment of the disclosure, there may be provided one or more non-transitory computer-readable recording media having stored thereon a program for executing the image processing method for AI-based filtering.

Various example embodiments of the disclosure described above may be written as programs executable by a computer, and the written programs may be stored in machine-readable storage media.

The machine-readable storage media may be provided as non-transitory storage media. The "non-transitory storage media" may refer to tangible devices and may not include signals (e.g., electromagnetic waves), and does not distinguish the storage media semi-permanently storing data and the storage media temporarily storing data. For example, the "non-transitory storage media" may include a buffer temporarily storing data.

According to an embodiment, the method according to various embodiments of the disclosure may be provided as an inclusion of a computer program product. The computer program product may be, as a product, transacted between a seller and a purchaser. The computer program product may be distributed in the form of a machine-readable storage medium (e.g., a compact disc (CD)-read-only memory (ROM)) or may be distributed online (e.g., downloaded or uploaded) through an application store or directly between two user devices (e.g., smartphones). In the case of online distribution, at least part of a computer program product (e.g., a downloadable application) may be at least temporarily stored in a machine-readable storage medium, such as a server of a manufacturer, a server of an application store, or a memory of a relay server, or may be temporarily generated.

While the disclosure has been illustrated and described with reference to various example embodiments, it will be understood that the various embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An image processing method for artificial intelligence (AI)-based filtering, the image processing method comprising:
   obtaining motion information regarding inter prediction of a current block of a current reconstructed image;
   determining at least one reference reconstructed image regarding the current reconstructed image based on the motion information regarding the inter prediction;
   determining at least one reference block based on the motion information and the at least one reference reconstructed image;
   obtaining an output block corresponding to the current block by inputting the current block and the at least one reference block to a neural network; and
   obtaining a modified current reconstructed image based on the output block,
   wherein the neural network is trained using training data including the current block, the at least one reference block, and the output block, to reduce an error between the current block and an original block corresponding to the current block,
   the motion information comprises information regarding a reference image used for decoding the current reconstructed image, and a motion vector,
   the at least one reference reconstructed image is determined based on the information regarding the reference image, and
   the at least one reference block is determined based on the motion vector and the at least one reference reconstructed image.

2. The image processing method of claim 1, wherein the obtaining of the motion information comprises:
   determining a plurality of candidate motion information, based on motion information of a plurality of sub-blocks at specified positions of the current block; and
   obtaining the motion information from among the plurality of candidate motion information.

3. The image processing method of claim 2, wherein the determining of the at least one reference reconstructed image comprises determining one image corresponding to a temporally previous image of the current reconstructed image and an image corresponding to a temporally next image of the current reconstructed image, from among a plurality of images corresponding to the plurality of candidate motion information, as the at least one reference reconstructed image.

4. The image processing method of claim 1, wherein the determining of the at least one reference block comprises:
   determining a plurality of blocks included in the at least one reference reconstructed image;
   calculating a difference value between each of the plurality of blocks and the current block, based on a pixel value of each of the plurality of blocks and a pixel value of the current block; and
   determining the at least one reference block, based on the difference value between each of the plurality of blocks and the current block.

5. An image processing method for artificial intelligence (AI)-based filtering, the image processing method comprising:
   obtaining motion information regarding inter prediction of a current block of a current reconstructed image;
   determining at least one reference reconstructed image regarding the current reconstructed image based on the motion information regarding the inter prediction;
   determining at least one reference block based on the motion information and the at least one reference reconstructed image;
   obtaining an output block corresponding to the current block by inputting the current block and the at least one reference block to a neural network; and
   obtaining a modified current reconstructed image based on the output block,
   wherein the neural network is trained using training data including the current block, the at least one reference block, and the output block, to reduce an error between the current block and an original block corresponding to the current block,
   the determining of the at least one reference block comprises:
   determining a plurality of blocks included in the at least one reference reconstructed image;
   calculating a difference value between each of the plurality of blocks and the current block, based on a pixel value of each of the plurality of blocks and a pixel value of the current block; and
   determining the at least one reference block, based on the difference value between each of the plurality of blocks and the current block.

6. The image processing method of claim 5, wherein the calculating of the difference value between each of the plurality of blocks and the current block comprises calculating the difference value, based on the pixel value of each of the plurality of blocks and the pixel value of the current block, using a method of at least one of a sum of absolute differences (SAD), a sum of squared errors (SSE), or a mean square error (MSE).

7. The image processing method of claim 1, further comprising:
   obtaining at least one of a quantization parameter (QP) of the current reconstructed image or a quantization parameter of the at least one reference reconstructed image; and
   determining the neural network from among a plurality of neural networks based on at least one of the quantization parameter of the current reconstructed image, the quantization parameter of the at least one reference reconstructed image, or a difference between the quantization parameter of the current reconstructed image and the quantization parameter of the at least one reference reconstructed image.

8. The image processing method of claim 7, wherein the quantization parameter of the at least one reference reconstructed image is greater than the quantization parameter of the current reconstructed image.

9. The image processing method of claim 1, wherein the at least one reference reconstructed image and the current reconstructed image are included in a same group of pictures (GOP).

10. The image processing method of claim 1, wherein the at least one reference reconstructed image is decoded previously to the current reconstructed image.

11. An image processing apparatus for artificial intelligence (AI)-based filtering, the image processing apparatus comprising:
   a memory storing at least one instruction; and
   at least one processor, comprising processing circuitry, individually and/or collectively configured to:

obtain motion information regarding inter prediction of a current block of a current reconstructed image;

determine at least one reference reconstructed image regarding the current reconstructed image based on the motion information regarding the inter prediction;

determine at least one reference block based on the motion information and the at least one reference reconstructed image;

obtain an output block corresponding to the current block by inputting the current block and the at least one reference block to a neural network; and based on the output block, obtain a modified current reconstructed image, wherein the neural network is trained using training data including the current block, the at least one reference block, and the output block, to reduce an error between the current block and an original block corresponding to the current block, the motion information comprises information regarding a reference image and a motion vector, the at least one reference reconstructed image is determined based on the information regarding the reference image, and the at least one reference block is determined based on the motion vector and the at least one reference reconstructed image.

12. The image processing apparatus of claim 11, wherein at least one processor, individually and/or collectively is configured to:

determine a plurality of candidate motion information, based on motion information of a plurality of sub-blocks at predetermined positions of the current block; and obtain the motion information from among the plurality of candidate motion information.

13. The image processing apparatus of claim 12, wherein at least one processor, individually and/or collectively is configured to: determine one image corresponding to a temporally previous image of the current reconstructed image and an image corresponding to a temporally next image of the current reconstructed image, from among a plurality of images corresponding to the plurality of candidate motion information, as the at least one reference reconstructed image.

14. A non-transitory computer-readable recording medium having stored thereon a program for executing the method of claim 1.

* * * * *